US012567083B1

(12) United States Patent
Miller et al.

(10) Patent No.: US 12,567,083 B1
(45) Date of Patent: Mar. 3, 2026

(54) TELECOMMUNICATIONS PRODUCT IMPACT SERVICE

(71) Applicant: AT&T Intellectual Property I, L.P., Atlanta, GA (US)

(72) Inventors: Jay Miller, Dallas, TX (US); Meredith Johnson, Dallas, TX (US); Carlos Garrett, Allen, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 18/904,179

(22) Filed: Oct. 2, 2024

(51) Int. Cl.
*G06Q 30/0201* (2023.01)

(52) U.S. Cl.
CPC ................................ *G06Q 30/0206* (2013.01)

(58) Field of Classification Search
CPC ................................................. G06Q 30/0206
See application file for complete search history.

(56) References Cited

U.S. PATENT DOCUMENTS

2016/0232546 A1* 8/2016 Ranft ................. G06Q 30/0206
2022/0058744 A1* 2/2022 Dar ........................ G16H 40/67

OTHER PUBLICATIONS

Tsvetoslava Kyoseva, Disruptive Innovations as a Driving Force for the Change of Wireless Telecommunication Infrastructures, 2014, p. 1683-1685 (Year: 2014).*

* cited by examiner

*Primary Examiner* — Ibrahim N El-Bathy
(74) *Attorney, Agent, or Firm* — Hartman & Citrin LLC

(57) ABSTRACT

A telecommunications product impact service can receive a report request including a request for a product impact report, the report request including data that identifies a product offered by a network. Based on the data that identifies the product offered by the network, product impact data that includes product overview data, customer data, and pricing data can be analyzed, and a report that includes data identifying an impact of a pricing change associated with the product can be generated and provided to a user device. Input that indicates an action to be taken with respect to the product based on the impact of the pricing change associated with the product can be received, and a command can be generated including instructions that, when executed by network management entities, cause the network management entities to take the action to mitigate the impact of the pricing change.

20 Claims, 14 Drawing Sheets

500A

500B

500C

500D

TELECOMMUNICATIONS PRODUCT IMPACT SERVICE

BACKGROUND

In modern telecommunications networks, hundreds or even thousands of services can be offered, with many versions or releases existing simultaneously among various customers. Furthermore, customers of telecommunications networks can include individuals, small businesses, and large enterprises that can respond to changes to products and/or changes to costs associated with products in different ways. Given the diversity of the product offerings in locations and/or among customers, evaluating and/or tracking changes to the products can be difficult.

SUMMARY

The present disclosure is directed to a telecommunications product impact service. One or more customer devices can communicate with the network to use one or more products offered by the network. Thus, the customer devices can correspond to customers as illustrated and described herein. It should be understood that this example embodiment is illustrative, and therefore should not be construed as being limiting in any way. The network can be configured to monitor interactions between the customer devices and the network including, for example, products used and/or subscribed to by the customer devices, histories associated with the use of and/or subscription to the products, and the like. The network also can track and/or monitor billing and/or charging histories for the products and/or the customers or accounts associated with the customer devices. In various embodiments of the concepts and technologies disclosed herein, the network can include and/or can access various data sources such as, for example, a product catalog for storing data defining products and/or product portfolios (or bundles) that are available on the network, a billing database that can store data defining costs and/or charges for using and/or subscribing to a product offered by the network, an account database that can store data defining accounts for entities using and/or subscribing to a product offered by the network, a customer database that can store data defining one or more customers and/or customer cohorts for entities using and/or subscribing to a product offered by the network, and/or other databases or other data sources.

At some time, a product impact service can obtain usage and change data from the one or more data sources. The usage and change data can include product data that can be used to define products and/or product portfolios offered by the network, billing data that can be used to determine charges and/or billing associated with the products and/or product portfolios offered by the network, customer data that can be used to define one or more customers or customer cohorts that use or subscribe to products and/or product portfolios offered by the network, grouping data that can be used to define groups of two or more products and/or product portfolios offered by the network, and/or other data. The product impact service can analyze the usage and group data to generate product impact data. The product impact data can reflect usage of the products, customers that use the products, an impact on subscriptions to and/or uses of the products when prices or charges are modified by the network, relationships between the products offered by the network, combinations thereof, or the like.

At some time, the server computer (or the product impact service executed thereby) can receive a report request, which can be created by a user device or other device or entity. In some instances, the report request can be generated, for example, to evaluate a possible price increase for a product, and as such the report request can include data describing a proposed price increase. It should be understood that this example embodiment is illustrative, and therefore should not be construed as being limiting in any way. The product impact service can generate a report that responds to the report request and provide the report to the user device. In some instances, the report can provide information relating to an expected impact from the proposed price increase. It should be understood that this example embodiment is illustrative, and therefore should not be construed as being limiting in any way. The report can be presented and/or analyzed at the user device (e.g., by the report analysis application). Based on the analysis of the report, the user device and/or the report analysis application can determine an action to take with respect to the product such as, for example, modifying a price change for the product (e.g., a future contemplated price increase can be analyzed using the report and potentially changed based on the analysis of the report), or the like. Input reflecting the action to be taken can be provided to the server computer.

The server computer can receive the input and generate one or more commands for implementing the action on the network. The server computer can send the commands to one or more entities on the network such as, for example, the network management entities. The network management entities can implement the commands to change the product and/or various aspects thereof such as, for example, a price for the product, whether the product is part of a product portfolio (or bundle), customers that can or cannot access the product, and the like. Thus, the product impact service can take actions to modify products and/or billing for products to improve use of the products, customer retention, and the like. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include receiving, from a user device, a report request that can include a request for a product impact report, the report request further including data that identifies a product offered by a network to a customer device. The operations also can include analyzing, based on the data that identifies the product, product impact data that can include product overview data, cohort data, and pricing data; generating, based on the product impact data identified, a report that can include data identifying an impact of a pricing change associated with the product; providing, to the user device, the report; receiving, from the user device, input that can indicate an action to be taken with respect to the product based on the impact of the pricing change associated with the product; generating a command including instructions that, when executed by network management entities, cause the network management entities to take the action; and triggering delivery of the command to the network management entities, whereby the product can be modified by the network management entities to mitigate the impact of the pricing change.

In some embodiments, the product impact data can be generated based on data obtained from data sources in communication with the network management entity. In some embodiments, the operations can further include obtaining usage and change data from data sources in communication with the network management entity, the data sources including a product catalog, a billing database, and a customer database; analyzing usage and change data to generate product overview data that defines the product, portfolio data that defines a product portfolio that can include the product, pricing data that defines price changes associated with the product over time, and cohort data that defines customers associated with the product over time; and storing the product impact data.

In some embodiments, the usage and change data can include product data, billing data, customer data, and grouping data. In some embodiments, the data sources further can include an account database and other databases. In some embodiments, the other databases can store revenue data for the product, and the report can reflect revenue associated with the product over time. In some embodiments, the report further can include an identification of the product, a customer associated with the product, a customer cohort associated with the product, and a usage history associated with the product.

According to another aspect of the concepts and technologies disclosed herein, a method is disclosed. The method can include receiving, by a computer having a processor and from a user device, a report request that can include a request for a product impact report, the report request further including data that identifies a product offered by a network to a customer device. The method also can include analyzing, by the processor and based on the data that identifies the product, product impact data that can include product overview data, cohort data, and pricing data; generating, by the processor and based on the product impact data identified, a report that can include data identifying an impact of a pricing change associated with the product; providing, by the computer and to the user device, the report; receiving, by the computer and from the user device, input that can indicate an action to be taken with respect to the product based on the impact of the pricing change associated with the product; generating, by the processor, a command including instructions that, when executed by network management entities, cause the network management entities to take the action; and triggering, by the processor, delivery of the command to the network management entities, whereby the product can be modified by the network management entities to mitigate the impact of the pricing change.

In some embodiments, the product impact data can be generated based on data obtained from data sources in communication with the network management entity. In some embodiments, the method can further include obtaining usage and change data from data sources in communication with the network management entity, the data sources including a product catalog, a billing database, and a customer database; analyzing usage and change data to generate product overview data that defines the product, portfolio data that defines a product portfolio that can include the product, pricing data that defines price changes associated with the product over time, and cohort data that defines customers associated with the product over time; and storing the product impact data.

In some embodiments, the usage and change data can include product data, billing data, customer data, and grouping data. In some embodiments, the data sources further can include an account database and other databases. In some embodiments, the other databases can store revenue data for the product, and the report can reflect revenue associated with the product over time. In some embodiments, the report further can include an identification of the product, a customer associated with the product, a customer cohort associated with the product, and a usage history associated with the product.

According to yet another aspect of the concepts and technologies disclosed herein, a computer storage medium is disclosed. The computer storage medium can store computer-executable instructions that, when executed by a processor, cause the processor to perform operations. The operations can include receiving, from a user device, a report request that can include a request for a product impact report, the report request further including data that identifies a product offered by a network to a customer device. The operations also can include analyzing, based on the data that identifies the product, product impact data that can include product overview data, cohort data, and pricing data; generating, based on the product impact data identified, a report that can include data identifying an impact of a pricing change associated with the product; providing, to the user device, the report; receiving, from the user device, input that can indicate an action to be taken with respect to the product based on the impact of the pricing change associated with the product; generating a command including instructions that, when executed by network management entities, cause the network management entities to take the action; and triggering delivery of the command to the network management entities, whereby the product can be modified by the network management entities to mitigate the impact of the pricing change.

In some embodiments, the product impact data can be generated based on data obtained from data sources in communication with the network management entity. In some embodiments, the operations can further include obtaining usage and change data from data sources in communication with the network management entity, the data sources including a product catalog, a billing database, and a customer database; analyzing usage and change data to generate product overview data that defines the product, portfolio data that defines a product portfolio that can include the product, pricing data that defines price changes associated with the product over time, and cohort data that defines customers associated with the product over time; and storing the product impact data.

In some embodiments, the usage and change data can include product data, billing data, customer data, and grouping data. In some embodiments, the data sources further can include an account database and other databases. In some embodiments, the other databases can store revenue data for the product, and the report can reflect revenue associated with the product over time. In some embodiments, the report further can include an identification of the product, a customer associated with the product, a customer cohort associated with the product, and a usage history associated with the product.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
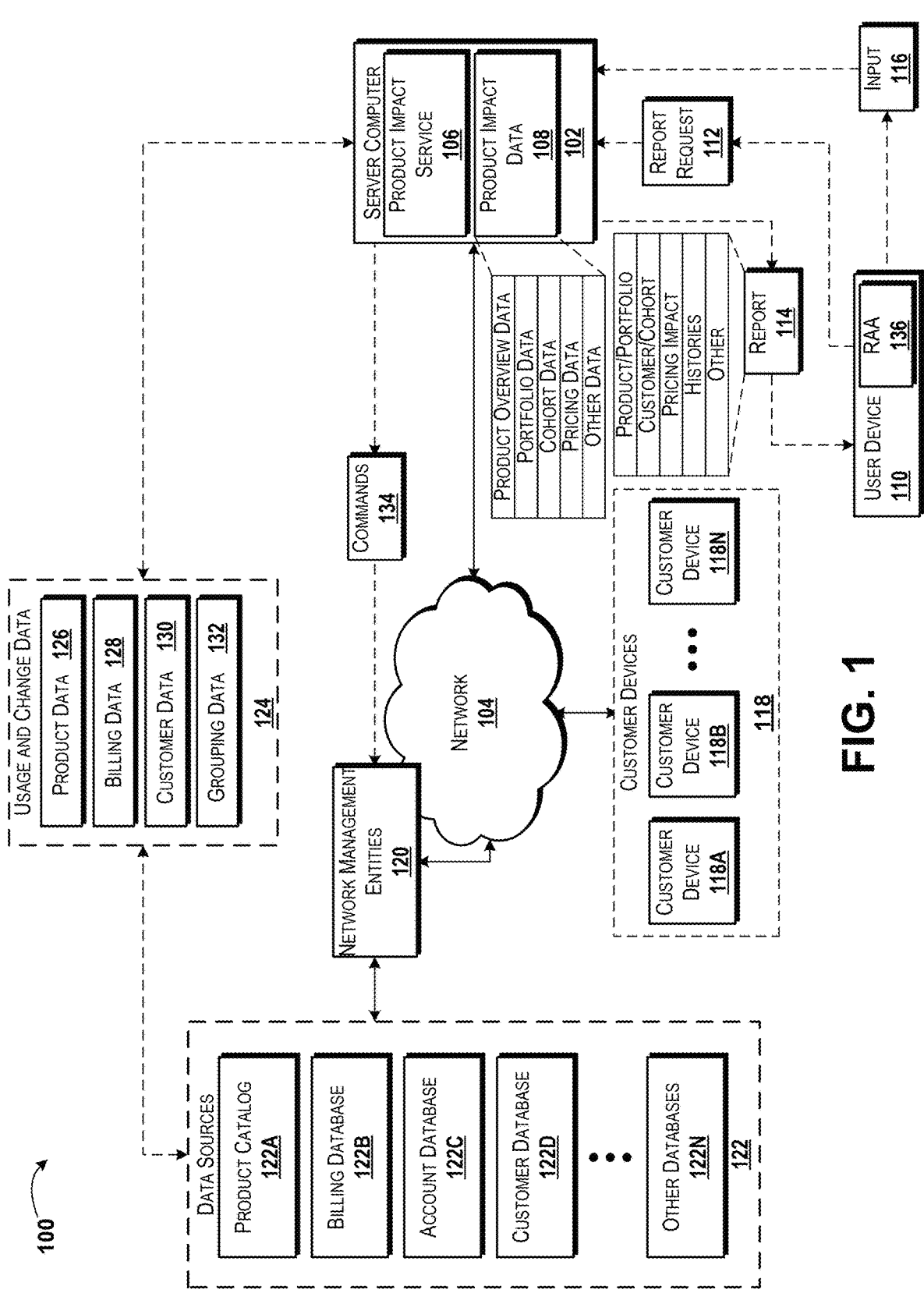
FIG. 1 is a system diagram illustrating an illustrative operating environment for various embodiments of the concepts and technologies described herein.

The following detailed description is directed to a telecommunications product impact service. One or more customer devices can communicate with the network to use one or more products offered by the network. Thus, the customer devices can correspond to customers as illustrated and described herein. It should be understood that this example embodiment is illustrative, and therefore should not be construed as being limiting in any way. The network can be configured to monitor interactions between the customer devices and the network including, for example, products used and/or subscribed to by the customer devices, histories associated with the use of and/or subscription to the products, and the like. The network also can track and/or monitor billing and/or charging histories for the products and/or the customers or accounts associated with the customer devices. In various embodiments of the concepts and technologies disclosed herein, the network can include and/or can access various data sources such as, for example, a product catalog for storing data defining products and/or product portfolios (or bundles) that are available on the network, a billing database that can store data defining costs and/or charges for using and/or subscribing to a product offered by the network, an account database that can store data defining accounts for entities using and/or subscribing to a product offered by the network, a customer database that can store data defining one or more customers and/or customer cohorts for entities using and/or subscribing to a product offered by the network, and/or other databases or other data sources.

At some time, a product impact service can obtain usage and change data from the one or more data sources. The usage and change data can include product data that can be used to define products and/or product portfolios offered by the network, billing data that can be used to determine charges and/or billing associated with the products and/or product portfolios offered by the network, customer data that can be used to define one or more customers or customer cohorts that use or subscribe to products and/or product portfolios offered by the network, grouping data that can be used to define groups of two or more products and/or product portfolios offered by the network, and/or other data. The product impact service can analyze the usage and group data to generate product impact data. The product impact data can reflect usage of the products, customers that use the products, an impact on subscriptions to and/or uses of the products when prices or charges are modified by the network, relationships between the products offered by the network, combinations thereof, or the like.

At some time, the server computer (or the product impact service executed thereby) can receive a report request, which can be created by a user device or other device or entity. The product impact service can generate a report that responds to the report request and provide the report to the user device. The report can be presented and/or analyzed at the user device (e.g., by the report analysis application). Based on the analysis of the report, the user device and/or the report analysis application can determine an action to take with respect to the product such as, for example, modifying a price change for the product (e.g., a future contemplated price increase can be analyzed using the report and potentially changed based on the analysis of the report), or the like. Input reflecting the action to be taken can be provided to the server computer.

The server computer can receive the input and generate one or more commands for implementing the action on the network. The server computer can send the commands to one or more entities on the network such as, for example, the network management entities. The network management entities can implement the commands to change the product and/or various aspects thereof such as, for example, a price for the product, whether the product is part of a product portfolio (or bundle), customers that can or cannot access the product, and the like. Thus, the product impact service can take actions to modify products and/or billing for products to improve use of the products, customer retention, and the like. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for telecommunications product impact service will be described, according to an illustrative embodiment. As used herein, the term "product" can be used to refer to a telecommunications product, application, feature, and/or service such as, for example, Internet connectivity, wireless service, landline service, fiber service, voicemail, call waiting, cloud storage, web hosting, and/or other services, products, features, applications, or the like. In some embodiments, a product may refer to a single application, feature, service, or the like, while in some other embodiments, a product may refer to a suite, bundle, or group of applications, features, services, or the like.

The operating environment 100 shown in FIG. 1 includes a server computer 102. The server computer 102 can operate in communication with and/or as part of a communications network ("network") 104, though this is not necessarily the case. According to various embodiments, the functionality of the server computer 102 may be provided by one or more server computers, desktop computers, mobile telephones, laptop computers, set-top boxes, other computing systems, and the like. It should be understood that the functionality of the server computer 102 may be provided by a single device, by two or more similar devices, and/or by two or more dissimilar devices. For purposes of describing the concepts and technologies disclosed herein, the server computer 102 is described herein as a server computer. It should be understood that this embodiment is illustrative, and should not be construed as being limiting in any way.

The server computer 102 can execute an operating system (not illustrated in FIG. 1) and one or more application programs such as, for example, a product impact service 106. The operating system can include a computer program that can control the operation of the server computer 102. The product impact service 106 can include an executable program that can be configured to execute on top of the operating system to provide various functions as illustrated and described herein. Among other things, the product impact service 106 can generate and use product impact data 108. These and other functions of the product impact service 106 will be illustrated and described in more detail herein after introducing other entities operating in the operating environment 100.

The server computer 102 can be configured to receive, from a user device 110, a report request 112. The report request 112 can request generation of a product impact report ("report") 114 that relates to a particular product; a billing and/or charging structure associated with the product; a proposed price increase for the product; one or more users or accounts that use or have used the product; one or more changes to the product, billing and/or costs of the product, and/or users or accounts associated with the product; one or more services that relate to and/or are grouped with the product; combinations thereof; or the like. The report 114 can be presented and/or displayed at the user device 110 and one or more instances of input 116 can be returned to the server computer 102 by the user device 110. It can be appreciated that interactions between the user device 110 and the server computer 102 can occur via a portal, an application programming interface ("API"), and/or other functionality that may be exposed by the server computer 102. These and/or other functions that can be enabled by the product impact service 106 and/or use of the product impact data 108 will be illustrated and described herein after introducing other entities operating in the operating environment 100.

The operating environment 100 also can include one or more customer devices 118A-118N (hereinafter collectively and/or generically referred to as "customer devices 118"), which can be configured to communicate with and/or via the network 104. According to various embodiments of the concepts and technologies disclosed herein, the network 104 can be monitored and/or managed by one or more network management entities 120. The network management entities 120 can be configured to control products offered by, supported by, enabled by, and/or managed by the network 104. These and other functions of the network management entities 120 will be illustrated and described herein after introducing other entities operating in the operating environment 100.

As shown in FIG. 1, the network management entities 120 can create and/or communicate with one or more data sources 122A-N (hereinafter collectively and/or generically referred to as "data sources 122"). According to various embodiments, the data sources 122 can be used to describe and/or store data defining one or more products or services offered by the network 104; to describe and/or store data defining one or more current groupings or bundles of products or services offered by the network 104; to manage and/or store data used for billing and/or charging associated one or more products or services offered by the network 104; to describe and/or store data defining one or more accounts using products or services offered by the network 104; to describe and/or store data defining customers using one or more products or services offered by the network 104; to describe and/or store other data; combinations thereof; or the like.

Thus, as shown in FIG. 1, the data sources 122 can include, but are not limited to, a product catalog 122A, a billing platform and/or billing database (labeled "billing database" in FIG. 1) 122B, an account platform and/or account database (labeled "account database" in FIG. 1) 122C, a customer registry, platform, and/or customer database (labeled "customer database" in FIG. 1) 122D, and/or one or more other platforms and/or databases (labeled "other databases" in FIG. 1) 122N. Because other data sources 122 can be included and/or are contemplated, it should be understood that these example embodiments are illustrative, and therefore should not be construed as being limiting in any way. The functions of the data sources 122 will be illustrated and described herein after introducing other entities operating in the operating environment 100.

According to various embodiments of the concepts and technologies disclosed herein, the server computer 102 can be configured to obtain, e.g., via execution of the product impact service 106, usage and change data 124. The usage and change data 124 can include various data relating to one or more product. The usage and change data 124 can be obtained from the data sources 122 and therefore can include, but is not limited to, data that can define and/or describe products, data that can define one or more changes made to products and/or pricing or bundling thereof, data that can define one or more users or accounts or customers using the products, data that can define billing and/or charging associated with the products and/or billing and/or charging changes, data that can define one or more groups of or relationships between two or more products, combinations thereof, or the like. Thus, the usage and change data 124 can include, but is not limited to, product data 126, billing data 128, customer data 130, grouping data 132, combinations thereof, or the like. As will be explained in more detail below, the product impact service 106 can be configured to obtain the usage and change data 124, to generate the product impact data 108, to generate reports 114 and/or obtain input 116, and to generate one or more commands 134 for making or suggesting actions (e.g., changes) to product offerings. This and other functions of the product impact service 106 will be explained in more detail below.

The product impact service 106 can be configured to obtain the usage and change data 124 from the data sources 122 at various times. According to some embodiments of the concepts and technologies disclosed herein, the data sources 122 can be configured to output the usage and change data 124 to the server computer 102 based on time intervals, randomly, when changes are detected, and/or at other times. Thus, the illustrated usage and change data 124 can correspond to a stream of data, to one or more instances of data via data releases or publications, one or more data sets of multiple instances of data, or the like. For purposes of illustrating and describing the embodiments of the concepts and technologies disclosed herein, the usage and change data 124 will be described as one or more instances of the usage and change data 124. It should be understood that this example embodiment is illustrative, and therefore should not be construed as being limiting in any way.

In some embodiments, the product impact service 106 can obtain the usage and change data 124 to determine, for one or more products, various operational and/or performance metrics such as, for example, revenue from the product over a particular timeframe, counts of customers using and/or paying for the product over a particular timeframe, customer segmentation for the product (e.g., demographics of customers using or subscribing to the product, customer histories for customers using or subscribing to the product, combinations thereof, or the like). Based on these and/or other considerations, the product impact service 106 can be configured to determine, for the product, a weekly, monthly, quarterly, and/or yearly outlook for the product (e.g., revenues, users, segments, etc.) and/or a long-range (e.g., one year, two years, five years, ten years, or the like) outlook for the product and/or a planning scheme for the product (e.g., projecting future releases of the product, adoption of the product over time, migration from the product to other products and/or among versions of the product, and the like). According to various embodiments of the concepts and technologies disclosed herein, the product impact service 106 can generate a product overview based on these and/or other data points, and can create product overview data as a component of the product impact data 108 (as illustrated in FIG. 1). It should be understood that this example embodiment is illustrative, and therefore should not be construed as being limiting in any way.

In some embodiments, the product impact service 106 can also use the usage and change data 124 to determine, for one or more products, relationships with other products and/or a bundle of products in which the product belongs. Based on these determined relationships, the product impact service 106 can be configured to determine, for the product, how a customer of a first product may obtain other products (e.g., cross-product penetration relating to one or more products, combinations of products in which the product is obtained), and the like. Based on the product groups and/or combinations determined, the product impact service 106 can also be configured to identify cross-sell opportunities (e.g., if a first user purchases a first product and many users bundle the first product with a second product, then the first user may be offered the second product as a result). It should be understood that this example embodiment is illustrative, and therefore should not be construed as being limiting in any way. According to various embodiments of the concepts and technologies disclosed herein, the product impact service 106 can create portfolio data. The portfolio data can represent a portfolio of products, with the phrase "portfolio" being used herein to refer to a group of products that are related to and/or likely to be bundled by customers. The portfolio data can be created as a component of the product impact data 108 (as illustrated in FIG. 1). It should be understood that this example embodiment is illustrative, and therefore should not be construed as being limiting in any way.

In some embodiments, the product impact service 106 can also use the usage and change data 124 to determine, for one or more products in one or more product portfolios, one or more customer cohorts. As used herein, the term "cohort" when used in association with customers can be used to refer to a type or set of customers (e.g., a demographic, a type of user, an archetype, or the like). For a particular cohort, counts of customers by customer segments, customer migration status based on customer segment value and/or other status, or the like can be determined for a particular product. Based on this and/or other information, the product impact service 106 can be configured to determine, for the product, how a typical customer in the customer cohort (e.g., a customer archetype) adopts the product, migrates among versions of the product, and/or impacts profitability for the product. According to various embodiments of the concepts and technologies disclosed herein, the product impact service 106 can create cohort data, and the cohort data can be created as a component of the product impact data 108 (as illustrated in FIG. 1). It should be understood that this example embodiment is illustrative, and therefore should not be construed as being limiting in any way.

In some embodiments, the product impact service 106 can also use the usage and change data 124 to determine, for one or more products in one or more product portfolios, pricing models that reflect how price affects use of the product, subscription to the product, subscription and/or use of other products (e.g., in a product portfolio), and/or other aspects of pricing. As used herein, the term "pricing" when used in association with customers can be used to refer to how a customer or cohort of customers are charged, billed, or the like for a particular product or product portfolio. Additionally, pricing can reflect increases and/or the effect thereof on product use and/or subscription by one or more customers and/or customer cohorts. Based on this and/or other information, the product impact service 106 can be configured to determine, for the product, how a price increase for a product or product portfolio may affect use and/or subscription to the product by a customer, customer cohort, customer cohort archetype, or the like. Thus, the product impact service 106 can determine and/or evaluate impacts of past price events (e.g., price increases or decreases) on product usage or subscriptions for particular customers or customer cohorts, revenue effects from price increases or decreases, or the like. According to various embodiments of the concepts and technologies disclosed herein, the product impact service 106 can create pricing data, and the pricing data can be created as a component of the product impact data 108 (as illustrated in FIG. 1). It should be understood that this example embodiment is illustrative, and therefore should not be construed as being limiting in any way.

As such, it can be appreciated that the product impact service 106 can determine, for a particular product and/or particular customer or customer cohort, outlooks for future use and/or subscription for a product (alone or as part of a product portfolio) by individual customers, customer cohorts, and/or in general; how products are grouped and/or subscribed to individually and/or as part of a product portfolio; how customer cohorts use products or product portfolios including migration and/or upgrade trends; and/or how pricing affects or does not affect the use of products and/or product portfolios by customers and/or customer cohorts. All of this information can be reflected, in various embodiments, by the product impact data 108, which the product impact service 106 can generate and store at the server computer 102. It should be understood that in some embodiments the product impact data 108 can be stored at other data storage devices or resources (instead of locally at the server computer 102) such as a database, a data store, a data server, combinations thereof, or the like. It should be understood that this example embodiment is illustrative, and therefore should not be construed as being limiting in any way.

According to various embodiments of the concepts and technologies disclosed herein, the user device 110 can access the product impact service 106. For example, the server computer 102 can expose an API, a portal, and/or other interface of the user device 110 to access the product impact service 106. Regardless of how the connection is made, a user device 110 can be configured to generate a report request 112. The report request 112 can correspond to a request to generate a report 114 relating to a product, a product portfolio, a customer, a customer cohort, or the like. In some instances, the report request 112 can be generated, for example, to evaluate a possible price increase for a product. It should be understood that this example embodiment is illustrative, and therefore should not be construed as being limiting in any way. Thus, the report request 112 can include the request itself as well as data that identifies a product, a product portfolio or grouping, a customer or customer cohort, a proposed price increase, a time or date for the proposed price increase, customers that will be affected by the proposed price increase, combinations thereof, or the like. It should be understood that this example embodiment is illustrative, and therefore should not be construed as being limiting in any way.

The product impact service 106 can receive the report request 112 and determine, based on the report request 112, a product, a product portfolio or grouping, a customer or customer cohort, a pricing structure, or other aspect of a product and/or usage thereof that is to be analyzed for the report 114. Thus, for example, the product impact service 106 can be configured to generate the report 114 for the specified product, product portfolio or grouping, customer, customer cohort, and provide the report 114 to the user device 110. According to various embodiments, the report 114 can include information that identifies the product, a product portfolio associated with the product (if there is an associated product portfolio), a customer and/or customer cohort associated with the reported information, pricing impact information that relates pricing changes with usage, histories of usage and/or pricing, and/or other information such as real and/or projected revenues in the past and/or predicted for the future based on usage and/or pricing changes. It should be understood that this example embodiment is illustrative, and therefore should not be construed as being limiting in any way.

According to some example embodiments of the concepts and technologies disclosed herein, the report 114 can include information that identifies a product and/or group of products, a customer or group of customers that uses the product, a pricing history associated with the product and/or group of products, and/or other information such as revenue projections. Because the report 114 can include additional and/or alternative information, it should be understood that this example embodiment is illustrative, and therefore should not be construed as being limiting in any way.

The report 114 can be presented at the user device 110. According to various embodiments of the concepts and technologies disclosed herein, the report 114 can be provided as a visualization such as a web page or the like, which can be presented at the user device 110 and interacted with by a user of the user device 110. Thus, a user or other entity (e.g., an application, artificial intelligence process, and/or machine learning process that executes at the user device 110 such as the report analysis application 136 (labeled "RAA 136" in FIG. 1)) can review and/or consume the report 114 to determine, based on the report 114, an impact pricing has on the usage of a product and/or product portfolio, a projected usage of the product or product portfolio based on a future change in pricing of the product, and/or the like.

While the illustrated embodiment illustrates the report 114 being analyzed at and/or by the user device 110, it should be understood that various embodiments of the concepts and technologies disclosed herein can include a product impact service 106 that includes and/or incorporates the functionality of the report analysis application 136 (e.g., as a module or process) and/or the functionality of the report analysis application 136 can be hosted and/or executed by the server computer 102 instead of, or in addition to, the user device 110. Thus, the report 114 can correspond to data that can be operated on at the server computer 102 in some embodiments and the input 116 therefore can correspond to a command or request generated at the server computer 102. It should be understood that this example embodiment is illustrative, and therefore should not be construed as being limiting in any way.

Thus, upon analyzing the report 114 at the user device 110 (e.g., using the report analysis application 136 or other application program executed at the user device 110) the user device 110 can create input 116 that can correspond to designation of an action to take based on the pricing impact determined from the report 114. The input 116 can indicate, for example, that a particular product should be added or removed from a particular product portfolio, that a particular price change should or should not be made to a product or product portfolio, or other actions that should be taken to reduce the impact of a pricing event or other change indicated by the product impact data 108. It should be understood that this example embodiment is illustrative, and therefore should not be construed as being limiting in any way.

The input 116 can be received by the server computer 102 and analyzed by the product impact service 106. The product impact service 106 can be further configured to generate one or more commands 134. The commands 134 can correspond to computer-executable instructions that, when executed by a recipient, cause the recipient to perform a particular action. In various embodiments of the concepts and technologies disclosed herein, the commands 134 can instruct a recipient (e.g., one or more network management entities 120) to add a product to a product portfolio or other service offering, to change a price for a product or product portfolio, to cancel a planned pricing change for a product or product portfolio, and/or to take other actions to mitigate negative impacts of pricing changes, product changes, and/or product portfolio changes and/or to maximize positive impacts of pricing changes, product changes, and/or product portfolio changes. It should be understood that this example embodiment is illustrative, and therefore should not be construed as being limiting in any way.

The server computer 102 can be configured to send the commands 134 (or trigger delivery of the commands 134) to the network management entities 120. According to various embodiments of the concepts and technologies disclosed herein, the network management entities 120 can include, for example, pricing platforms, billing platforms, service management entities, network controllers, service controllers, and/or other devices or entities. The network management entities 120 can be configured to communicate with one or more of the data sources 122, for example, to modify a product or product portfolio stored in the product catalog 122A; to modify costs, charges, and/or cost changes as applied by the billing database 122B; to modify one or more accounts maintained by the account database 122C; to modify customers and/or customer cohorts as represented in the customer database 122D; combinations thereof; or the like. Thus, the commands 134 can be configured to effect one or more changes based on a determined or projected impact on a product or product portfolio.

In practice, one or more customer devices 118 can communicate with the network 104 to use one or more products offered by the network 104. Thus, the customer devices 118 can correspond to customers as illustrated and described herein. It should be understood that this example embodiment is illustrative, and therefore should not be construed as being limiting in any way. The network 104 can be configured to monitor interactions between the customer devices 118 and the network 104 including, for example, products used and/or subscribed to by the customer devices 118, histories associated with the use of and/or subscription to the products, and the like. The network 104 also can track and/or monitor billing and/or charging histories for the products and/or the customers or accounts associated with the customer devices 118. In various embodiments of the concepts and technologies disclosed herein, the network 104 can include and/or can access various data sources 122 such as, for example, a product catalog 122A for storing data defining products and/or product portfolios (or bundles) that are available on the network 104, a billing database 122B that can store data defining costs and/or charges for using and/or subscribing to a product offered by the network 104, an account database 122C that can store data defining accounts for entities using and/or subscribing to a product offered by the network 104, a customer database 122D that can store data defining one or more customers and/or customer cohorts for entities using and/or subscribing to a product offered by the network 104, and/or other databases 122N or other data sources.

At some time, a product impact service 106 can obtain usage and change data 124 from the one or more data sources 122. The usage and change data 124 can include product data 126 that can be used to define products and/or product portfolios offered by the network 104, billing data 128 that can be used to determine charges and/or billing associated with the products and/or product portfolios offered by the network 104, customer data 130 that can be used to define one or more customers or customer cohorts that use or subscribe to products and/or product portfolios offered by the network 104, grouping data 132 that can be used to define groups of two or more products and/or product portfolios offered by the network 104, and/or other data. The product impact service 106 can analyze the usage and change data 124 to generate product impact data 108. The product impact data 108 can reflect usage of the products, customers that use the products, an impact on subscriptions to and/or uses of the products when prices or charges are modified by the network 104, relationships between the products offered by the network 104, combinations thereof, or the like.

At some time, the server computer 102 (or the product impact service 106 executed thereby) can receive a report request 112, which can be created by a user device 110 or other device or entity. The product impact service 106 can generate a report 114 that responds to the report request 112 and provide the report 114 to the user device 110. The report 114 can be presented and/or analyzed at the user device 110 (e.g., by the report analysis application 136). Based on the analysis of the report 114, the user device 110 and/or the report analysis application 136 can determine an action to take with respect to the product such as, for example, modifying a price change for the product (e.g., a future contemplated price increase can be analyzed using the report and potentially changed based on the analysis of the report 114), or the like. Input 116 reflecting the action to be taken can be provided to the server computer 102.

The server computer 102 can receive the input 116 and generate one or more commands 134 for implementing the action on the network 104. The server computer 102 can send the commands 134 to one or more entities on the network 104 such as, for example, the network management entities 120. The network management entities 120 can implement the commands 134 to change the product and/or various aspects thereof such as, for example, a price for the product, whether the product is part of a product portfolio (or bundle), customers that can or cannot access the product, and the like. Thus, the product impact service 106 can take actions to modify products and/or billing for products to improve use of the products, customer retention, and the like. It should be understood that this example embodiment is illustrative, and therefore should not be construed as being limiting in any way.

FIG. 1 illustrates one server computer 102, one network 104, one user device 110, three customer devices 118, one instance of network management entities 120, and five data sources 122. It should be understood, however, that various implementations of the operating environment 100 can include one or more than one server computer 102; one or more than one network 104; zero, one, or more than one user device 110; one, two, three, or more than three customer devices 118; zero, one, or more than one instance of network management entities 120; and zero, one, two, three, four, five, or more than five data sources 122. As such, the illustrated embodiment should be understood as being illustrative, and should not be construed as being limiting in any way.

Figure 2:
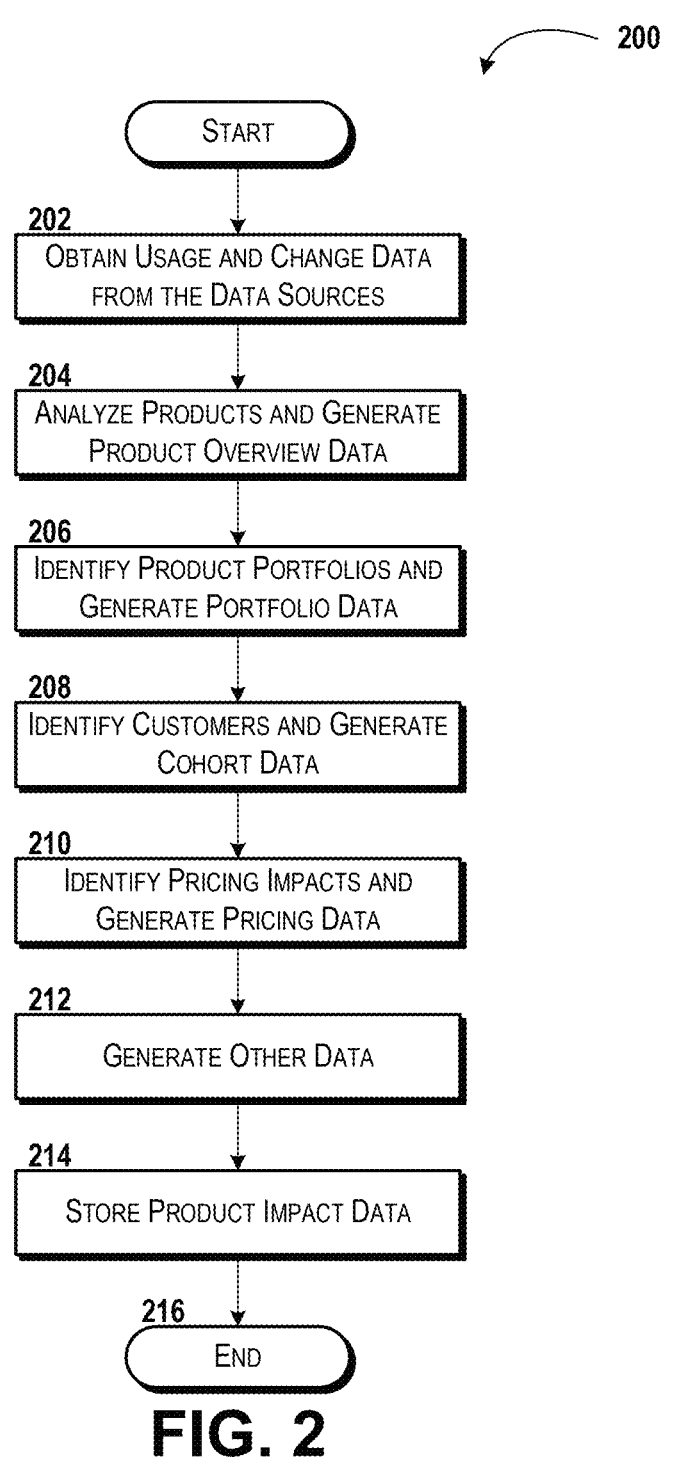
FIG. 2 is a flow diagram showing aspects of a method for generating product impact data, according to an illustrative embodiment of the concepts and technologies described herein.

Turning now to FIG. 2, aspects of a method 200 for generating product impact data 108 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102 and/or the user device 110, to perform one or more operations and/or causing the processor to direct other components of the computing system or device to perform one or more of the operations.

For purposes of illustrating and describing the concepts of the present disclosure, the method 200 is described herein as being performed by the server computer 102 via execution of one or more software modules such as, for example, the product impact service 106. It should be understood that additional and/or alternative devices and/or network nodes can provide the functionality described herein via execution of one or more modules, applications, and/or other software including, but not limited to, the product impact service 106. Thus, the illustrated embodiments are illustrative, and should not be viewed as being limiting in any way.

The method 200 begins at operation 202. At operation 202, the server computer 102 can obtain usage and change data 124 from one or more of the data sources 122. While FIG. 1 illustrates the usage and change data 124 being received by the server computer 102 directly from the data sources 122, it should be understood that in various embodiments other devices and/or entities can be configured to collect, report, publish, and/or otherwise provide the usage and change data 124 to the server computer 102. As such, it should be understood that this example embodiment is illustrative, and therefore should not be construed as being limiting in any way.

As explained above, the data sources 122 can include various network entities and/or elements (and can include in some embodiments the network management entities 120). Thus, the usage and change data 124 obtained by the server computer 102 in operation 202 can include, but is not limited to, data that defines and/or describes products, data that defines one or more changes made to products (e.g., versioning, feature removal or addition, pricing, or the like), data that defines one or more changes made to product bundling and/or availability, data that defines one or more customers (or customer accounts) using or subscribing to the products, data that defines billing and/or charging for the product and/or associated bundle of products or product portfolio, data that defines billing and/or charging changes for the product and/or associated bundle of products or product portfolio, data that defines one or more groups of or relationships between two or more products, data that defines customers and/or customer cohorts for the product and/or associated bundle of products or product portfolio, combinations thereof, or the like. Thus, the usage and change data 124 can include, but is not limited to, the product data 126, the billing data 128, the customer data 130, the grouping data 132, other data, combinations thereof, or the like, as explained herein.

Furthermore, as explained above, it should be understood that the usage and change data 124 can be received by the server computer 102 at various time intervals (seconds, minutes, hours, or days), randomly, when the data sources 122 create a new instance of usage and change data 124, on request by the server computer 102, and/or at other times. Thus, the server computer 102 can receive the usage and change data 124 as part of a stream of data, as one or more instances of data via one or more data releases or publications, as one or more data sets of multiple instances of data, combinations thereof, or the like. Because the usage and change data 124 can be obtained at additional and/or alternative times, it should be understood that these example embodiments are illustrative, and therefore should not be construed as being limiting in any way.

From operation 202, the method 200 can proceed to operation 204. At operation 204, the server computer 102 can analyze one or more products represented by the usage and change data 124 and generate product overview data. In some embodiments, operation 204 can correspond to the server computer 102 identifying, in the usage and change data 124 obtained in operation 202, product data 126 and/or other data that defines and/or describes one or more products. It should be understood that the server computer 102 also can analyze, in operation 204 and/or other operations illustrated and described herein, other portions of the usage and change data 124 such as the billing data 128, the customer data 130, and/or the grouping data 132. The product data 126 can include, but is not limited to, data that describes the product, provides a name for the product, describes operational and/or performance metrics for the product, describes network resources that support the product, describes revenues for the product over a particular timeframe, describes numbers of customers using and/or paying for the product over a particular timeframe, describes customer segmentation for the product (e.g., demographics of customers using or subscribing to the product, customer histories for customers using or subscribing to the product, combinations thereof, or the like), describes versions of the product, describes availability of the product, and/or otherwise describes the product and/or the use thereof.

The server computer 102 can generate, based on these and/or other data, the product and a description thereof, outlooks (in terms of usage, customers, revenues, support, and the like) associated with the product, versioning and/or migration issues for the product (e.g., projecting future releases of the product, adoption of the product over time, migration from the product to other products and/or among versions of the product, and the like), networking issues associated with the product, or the like. Thus, in operation 204, the server computer 102 can analyze the product data 126 and generate, based on the product data 126 and/or other data included in the usage and change data 124, a product overview. The product overview can include a data set or data object that defines the product and the associated information with the product as illustrated and described herein. It should be understood that this example embodiment is illustrative, and therefore should not be construed as being limiting in any way.

From operation 204, the method 200 can proceed to operation 206. At operation 206, the server computer 102 can identify product portfolios and generate portfolio data. In some embodiments, operation 206 can correspond to the server computer 102 further analyzing, in the usage and change data 124 obtained in operation 202, the product data 126 from which the product overview was generated, to determine, for one or more products, relationships between the product and one or more other products and/or a bundle of products in which the product belongs. It should be understood that the server computer 102 also can analyze, in operation 206 and/or other operations illustrated and described herein, other portions of the usage and change data 124 such as the billing data 128, the customer data 130, and/or the grouping data 132. At any rate, based on any identified relationships between the product and other products, the server computer 102 can determine how a customer or customer cohort associated with a first product may use, obtain, subscribe to, and/or cancel one or more other products (e.g., the server computer 102 can determine cross-product penetration and/or relationships for the product and/or a combination of products in which the product is obtained).

It can be appreciated that these and/or other data can be analyzed by the server computer 102 to determine, among other things, cross-sell opportunities for a product or product portfolio. A cross-sell opportunity can include, for example, an indication that a particular customer cohort that subscribes to a first product often subscribes to a second product. Thus, another customer purchasing the first product and being associated with the customer cohort should be offered the second product. It should be understood that this example embodiment is illustrative, and therefore should not be construed as being limiting in any way. Additionally, these and/or other data can be analyzed by the server computer 102 to determine, among other things, customer migration behaviors (for customers or customer cohorts). For example, the migration behavior can indicate how customers of a particular product or product bundle (e.g., a product portfolio) adopt future versions, cancel service on particular events such as price changes, combinations thereof, or the like. At any rate, based on the analysis of operation 206, the server computer 102 can create portfolio data. The portfolio data can represent a portfolio of products and a relationship between one or more products within the portfolio. It should be understood that this example embodiment is illustrative, and therefore should not be construed as being limiting in any way.

From operation 206, the method 200 can proceed to operation 208. At operation 208, the server computer 102 can identify customers and generate cohort data. In some embodiments, operation 208 can correspond to the server computer 102 analyzing, in the usage and change data 124 obtained in operation 202, the customer data 130 and/or the grouping data 132, to determine, for one or more products in one or more product portfolios, one or more customer cohorts. It should be understood that the server computer 102 also can analyze, in operation 208 and/or other operations illustrated and described herein, other portions of the usage and change data 124 such as the billing data 128 and the customer data 130. Thus, operation 208 can correspond to the server computer 102 determining, for one or more products or product portfolios, a type or set of customers (e.g., a demographic, a type of user, an archetype, or the like). It should be understood that this example embodiment is illustrative, and therefore should not be construed as being limiting in any way.

For a particular customer cohort, the server computer 102 can determine counts of customers by customer segments, customer migration status based on customer segment value and/or other status, or the like for a particular product and/or product portfolio. Based on these and/or other aspects of customer cohorts, the server computer 102 can determine, for the product or product portfolio, how a typical customer in the customer cohort (e.g., a customer archetype) adopts the product, migrates among versions of the product, cancels the product, and/or impacts profitability for the product. According to various embodiments of the concepts and technologies disclosed herein, the server computer 102 can create cohort data that reflects these and/or other aspects of customer behavior associated with the product and/or product portfolio. It should be understood that this example embodiment is illustrative, and therefore should not be construed as being limiting in any way.

From operation 208, the method 200 can proceed to operation 210. At operation 210, the server computer 102 can identify pricing impacts and generate pricing data. In some embodiments, operation 210 can correspond to the server computer 102 analyzing, in the usage and change data 124 obtained in operation 202, the billing data 128, to determine, for one or more products in one or more product portfolios, one or more pricing impacts. It should be understood that the server computer 102 also can analyze, in operation 208 and/or other operations illustrated and described herein, other portions of the usage and change data 124 such as the product data 126, the customer data 130, and/or the grouping data 132.

In some embodiments, the server computer 102 can determine, for one or more products in one or more product portfolios, pricing models that reflect how price affects use of the product, subscription to the product, subscription and/or use of other products (e.g., in a product portfolio), and/or other aspects of pricing including how a customer or cohort of customers are charged, billed, or the like for a particular product or product portfolio and/or how pricing affects customer use and/or subscription to the product or product portfolio. The server computer 102 also can determine, in operation 210, how pricing changes and/or the effect thereof on product use and/or subscription by one or more customers and/or customer cohorts. Thus, the server computer 102 can determine, in operation 210, how a price change for a product or product portfolio may affect use and/or subscription to the product by a customer, customer cohort, customer cohort archetype, or other entity. The server computer 102 may determine how price affects use of the product by determining and/or evaluating impacts of past price events such as, for example, price increases or decreases on product usage or subscriptions for particular customers or customer cohorts, revenue effects from price increases or decreases, or the like. The server computer 102 can determine these and/or other contours of pricing for products and generate pricing data. It should be understood that this example embodiment is illustrative, and therefore should not be construed as being limiting in any way.

From operation 210, the method 200 can proceed to operation 212. At operation 212, the server computer 102 can generate other data such as revenue information, versioning data, migration information, combinations thereof, or the like. Thus, the server computer 102 can analyze, in operation 212, other data and/or the usage and change data 124 obtained in operation 202 to determine, for one or more products in one or more product portfolios, versioning information, migration information, and the like. It should be understood that this example embodiment is illustrative, and therefore should not be construed as being limiting in any way.

From operation 212, the method 200 can proceed to operation 214. At operation 214, the server computer 102 can store product impact data 108. Thus, operation 214 can correspond to the server computer 102 collecting the data generated in operations 204 through 212 into a data set or other data object or data structure corresponding to the product impact data 108. As such, it can be appreciated that the server computer 102 can determine in operations 204 through 212 and for a particular product and/or particular customer or customer cohort, outlooks for future use and/or subscription for a product (alone or as part of a product portfolio) by individual customers, customer cohorts, and/or in general; how products are grouped and/or subscribed to individually and/or as part of a product portfolio; how customer cohorts use products or product portfolios including migration and/or upgrade trends; how pricing affects or does not affect the use of products and/or product portfolios by customers and/or customer cohorts; expected and/or projected revenues from products and/or product portfolios by customers and/or customer cohorts; combinations thereof; or the like. These data can be compiled by the server computer 102 into the product impact data 108, which the server computer 102 can generate and store at the server computer 102 and/or other data storage devices or resources. It should be understood that this example embodiment is illustrative, and therefore should not be construed as being limiting in any way.

From operation 214, the method 200 can proceed to operation 216. The method 200 can end at operation 216.

Figure 3:
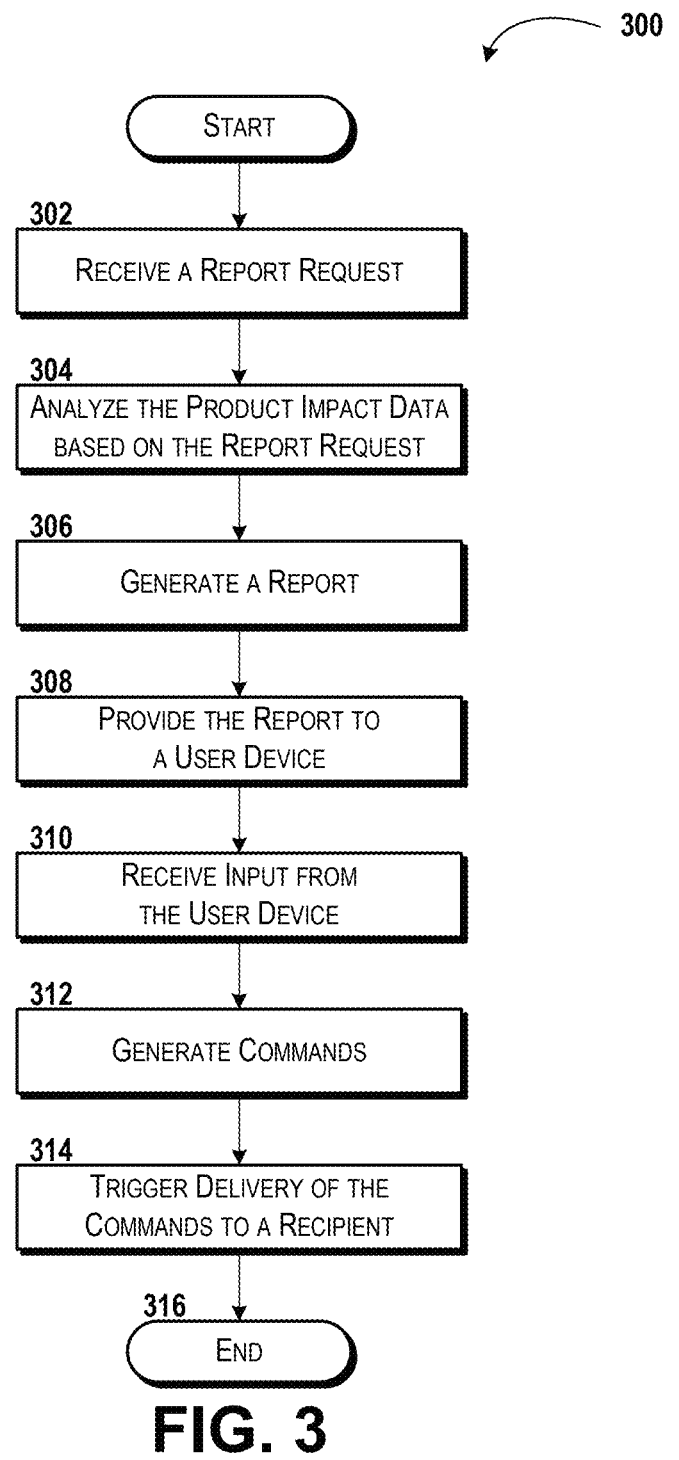
FIG. 3 is a flow diagram showing aspects of a method for requesting a report based on product impact data, according to an illustrative embodiment of the concepts and technologies described herein.

Turning now to FIG. 3, aspects of a method 300 for requesting a report 114 based on product impact data 108 will be described in detail, according to an illustrative embodiment. For purposes of illustrating and describing the concepts of the present disclosure, the method 300 is described herein as being performed by the server computer 102 via execution of one or more software modules such as, for example, the product impact service 106. It should be understood that additional and/or alternative devices and/or network nodes can provide the functionality described herein via execution of one or more modules, applications, and/or other software including, but not limited to, the product impact service 106. Thus, the illustrated embodiments are illustrative, and should not be viewed as being limiting in any way.

The method 300 begins at operation 302. At operation 302, the server computer 102 can receive a report request 112 from the user device 110. The report request 112 received in operation 302 can correspond to an explicit request to generate a report 114 relating to a product, a product portfolio, a customer, a customer cohort, a proposed price increase for the product, a proposed price increase for the product portfolio, a proposed price increase for a customer, a proposed price increase schedule, combinations thereof, or the like in some embodiments. In some other embodiments, the report request 112 can correspond to a service call received by the server computer 102. In some other embodiments, the report request 112 can correspond to selection of an option to request generation of a report 114 (e.g., via selection of a corresponding option in a web page or other interface between the server computer 102 and other device such as the user device 110). In yet other embodiments, the report request 112 can correspond to a program call from another device or entity. Thus, it should be understood that the server computer 102 can determine, based on various commands or requests, that a report 114 is being requested. In various embodiments, the report request 112 can include and/or can reference data identifying a product, a product portfolio or grouping, a customer or customer cohort, a proposed price increase, or the like, where this information can specify the subject matter of the report 114 being requested. It should be understood that this example embodiment is illustrative, and therefore should not be construed as being limiting in any way.

From operation 302, the method 300 can proceed to operation 304. At operation 304, the server computer 102 can analyze the product impact data 108 based on the report request 112. Although not separately illustrated in FIG. 3, it should be understood that in operation 302 or 304 the server computer 102 can determine, based on the report request 112 received in operation 302, a product, a product portfolio or grouping, a customer or customer cohort, contours and/or schedules of a proposed price increase for a product or product portfolio, or other aspect of a product and/or usage thereof that is to be analyzed for the report 114. Based on this and/or other information, the server computer 102 can analyze the product impact data 108 to identify data to be used to generate the report 114 being requested by the report request 112 received in operation 302. For example, in some embodiments of operation 304, the server computer 102 can construct and/or execute a query against the product impact data 108 based on the product, product portfolio, customer, customer cohort, or the like. In other embodiments, the server computer 102 can analyze the product impact data 108 based on these or other information. At any rate, operation 304 can include the server computer 102 identifying what data is to be obtained and then taking actions to obtain the data. It should be understood that this example embodiment is illustrative, and therefore should not be construed as being limiting in any way.

From operation 304, the method 300 can proceed to operation 306. At operation 306, the server computer 102 can generate a report 114. In particular, the server computer 102 can obtain the data identified and/or analyzed in operation 304 and generate the report 114 based on these data. The server computer 102 can generate the report 114 being requested by the report request 112 for the specified product, product portfolio or grouping, customer, customer cohort, price increase, or the like in operation 306. According to various embodiments, the report 114 can include information that identifies the product, a product portfolio associated with the product (if there is an associated product portfolio), a customer and/or customer cohort associated with the reported information, pricing impact information that relates pricing changes with usage, histories of usage and/or pricing, and/or other information such as real and/or projected revenues in the past and/or predicted for the future based on usage and/or pricing changes. Thus, in operation 306, the server computer 102 can generate data that reflects these and/or other aspects of the product and/or create renderable data for presenting these aspects of the product. It should be understood that this example embodiment is illustrative, and therefore should not be construed as being limiting in any way.

From operation 306, the method 300 can proceed to operation 308. At operation 308, the server computer 102 can provide the report 114 to the user device 110. According to various embodiments of the concepts and technologies disclosed herein, the server computer 102 can provide the report 114 to the user device 110 as a web page, as a file, as renderable data (e.g., for a visualization or the like), as application data, and/or in other formats, any and/or all of which may be interacted with by the user device 110 in some embodiments. Although not shown in FIG. 3, the user device 110 (and/or other entity such as a user or other entity including, but not limited to, an application, artificial intelligence process, and/or machine learning process that executes at the user device 110 or elsewhere) can review and/or consume the report 114 to determine, based on the report 114, an impact pricing has on the usage of a product and/or product portfolio, a projected usage of the product or product portfolio based on a future change in pricing of the product, and/or the like. It should be understood that this example embodiment is illustrative, and therefore should not be construed as being limiting in any way.

From operation 308, the method 300 can proceed to operation 310. At operation 310, the server computer 102 can receive input 116 from the user device 110. Although not shown in FIG. 3, the user device 110 can create input 116 that can correspond to designation of an action to take based on the pricing impact determined from the report 114. The input 116 can indicate, for example, that a particular product should be added or removed from a particular product portfolio, that a particular price change should or should not be made to a product or product portfolio, or other actions that should be taken to reduce the impact of a pricing event or other change indicated by the product impact data 108. Thus, operation 310 can correspond to the server computer 102 receiving these and/or other types of input 116 from the user device 110 (or other entity). It should be understood that this example embodiment is illustrative, and therefore should not be construed as being limiting in any way.

From operation 310, the method 300 can proceed to operation 312. At operation 312, the server computer 102 can generate one or more commands 134. The commands 134 can correspond to computer-executable instructions that, when executed by a recipient, cause the recipient to perform a particular action. In various embodiments of the concepts and technologies disclosed herein, the commands 134 can instruct a recipient (e.g., one or more network management entities 120) to add a product to a product portfolio or other service offering, to change a price for a product or product portfolio, to cancel a planned pricing change for a product or product portfolio, and/or to take other actions to mitigate negative impacts of pricing changes, product changes, and/or product portfolio changes and/or to maximize positive impacts of pricing changes, product changes, and/or product portfolio changes. Thus, operation 312 can correspond to the server computer 102 generating the computer-executable instructions for taking the above and/or other actions as disclosed herein. It should be understood that this example embodiment is illustrative, and therefore should not be construed as being limiting in any way.

From operation 312, the method 300 can proceed to operation 314. At operation 314, the server computer 102 can trigger delivery of the commands 134 to a recipient such as, for example, the network management entities 120 shown in FIG. 1. According to various embodiments of the concepts and technologies disclosed herein, the network management entities 120 can include, for example, pricing platforms, billing platforms, service management entities, network controllers, service controllers, and/or other devices or entities. As noted above, the network management entities 120 can be configured to communicate with one or more of the data sources 122, for example, to modify a product or product portfolio stored in the product catalog 122A; to modify costs, charges, and/or cost changes as applied by the billing database 122B; to modify one or more accounts maintained by the account database 122C; to modify customers and/or customer cohorts as represented in the customer database 122D; combinations thereof; or the like. Thus, the commands 134 can be configured to effect one or more changes based on a determined or projected impact on a product or product portfolio. It should be understood that this example embodiment is illustrative, and therefore should not be construed as being limiting in any way.

From operation 314, the method 300 can proceed to operation 316. The method 300 can end at operation 316.

Figure 4:
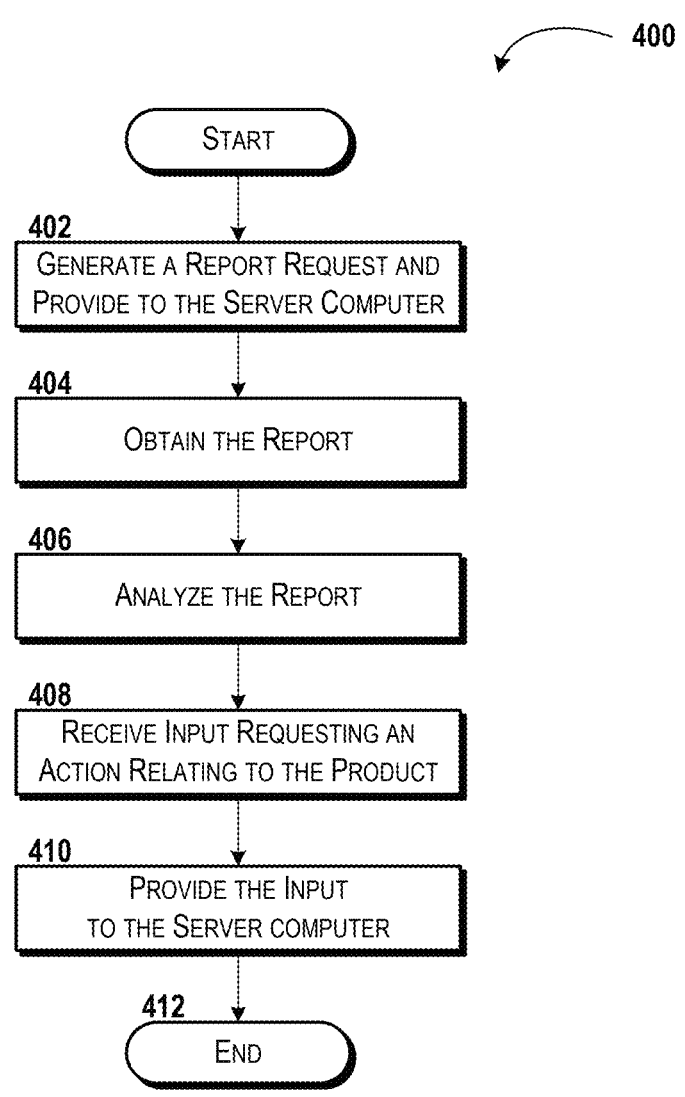
FIG. 4 is a flow diagram showing aspects of a method for modifying a product or service based on product impact data, according to an illustrative embodiment of the concepts and technologies described herein.

Turning now to FIG. 4, aspects of a method 400 for modifying a product or service based on product impact data 108 will be described in detail, according to an illustrative embodiment. For purposes of illustrating and describing the concepts of the present disclosure, the method 400 is described herein as being performed by the user device 110 via execution of one or more software modules such as, for example, the report analysis application 136. It should be understood that additional and/or alternative devices and/or network nodes can provide the functionality described herein via execution of one or more modules, applications, and/or other software including, but not limited to, the report analysis application 136. Thus, the illustrated embodiments are illustrative, and should not be viewed as being limiting in any way.

As noted above, while the illustrated and described embodiment of the method 400 is described as occurring at the user device 110, it should be understood that various embodiments of the concepts and technologies disclosed herein can include a product impact service 106 that includes and/or incorporates the functionality of the report analysis application 136 (e.g., as a module or process) and/or the functionality of the report analysis application 136 can be hosted and/or executed by the server computer 102 instead of, or in addition to, the user device 110. Thus, the functionality described herein with respect to the method 400 can be provided by operations performed at the server computer 102 in some embodiments. As such, it should be understood that the illustrated embodiment is illustrative and should not be construed as being limiting in any way.

The method 400 begins at operation 402. At operation 402, the user device 110 can generate a report request 112 and provide the report request 112 to the server computer 102. The report request 112 can relate to a product, a product portfolio, a customer, a customer cohort, a proposed price increase for a product, or the like. As explained above, the report request 112 can include an explicit request to generate a report 114, a service call generated by the user device 110, a selection of an option to request generation of a report 114 (e.g., via selection of a corresponding option in a web page or other interface presented at the user device 110), a program call, or the like. The report request 112 generated in operation 402 can include and/or can reference data identifying a product, a product portfolio or grouping, a customer or customer cohort, or the like, where this information can specify the subject matter of the report 114 being requested. Thus, operation 402 can correspond to the user device 110 identifying the product, product portfolio or grouping, customer or customer cohort, or the like, and generating the report request 112 with this and/or other information. It should be understood that this example embodiment is illustrative, and therefore should not be construed as being limiting in any way.

From operation 402, the method 400 can proceed to operation 404. At operation 404, the user device 110 can obtain the report 114. As illustrated and described herein, the report 114 can be generated by the server computer 102 (e.g., via performance of the operations of the method 300 illustrated and described herein). As such, it can be appreciated that the report 114 obtained in operation 404 can include information that identifies the product, information that identifies a product portfolio associated with the product (if applicable), information that identifies a customer associated with the product, information that identifies a customer cohort associated with the product (if applicable), information that identifies a pricing impact for price changes (e.g., how pricing changes relate to product usage and/or subscriptions), information that identifies histories of usage and/or pricing associated with the product, and/or other information that identifies, for example, real and/or projected revenues in the past and/or predicted for the future based on usage and/or pricing changes.

As noted above, the report 114 can be obtained by the user device 110 as a web page, as a file, as renderable data (e.g., for a visualization or the like), as application data, and/or in other formats, any and/or all of which may be interacted with by the user device 110 in some embodiments. The report 114 can be provided in additional and/or alternative formats according to various embodiments of the concepts and technologies disclosed herein. As such, it should be understood that the above examples are illustrative and should not be construed as being limiting in any way.

From operation 404, the method 400 can proceed to operation 406. At operation 406, the user device 110 can analyze the report 114. The user device 110 can execute and/or host an application or other module or process such as, for example, a software application, an artificial intelligence process, a machine learning process, a routine or subroutine, and/or other functionality such as the report analysis application 136 illustrated and described herein. The user device 110 can review and/or consume the report 114 to determine, based on the report 114, an impact pricing has on the usage of a product and/or product portfolio, a projected usage of the product or product portfolio based on a future change in pricing of the product, other product or customer related information, combinations thereof, or the like. At any rate, the report 114 can be analyzed and presented at the user device 110 in some embodiments. It should be understood that this example embodiment is illustrative, and therefore should not be construed as being limiting in any way.

From operation 406, the method 400 can proceed to operation 408. At operation 408, the user device 110 can receive input 116 requesting an action relating to the product. The input 116 obtained in operation 408 can correspond to an action generated by the user device 110 (e.g., via execution of the report analysis application 136) and/or a selection, command, or the like entered by a user or other entity. As explained above, the action can include, among other things, adding a product to a product portfolio or other service offering, removing a product from a product portfolio or other service offering, changing a price for a product or product portfolio, canceling a planned pricing change for a product or product portfolio, and/or other actions. Because other actions are illustrated and described herein, it should be understood that these examples are illustrative, and therefore should not be construed as being limiting in any way.

From operation 408, the method 400 can proceed to operation 410. At operation 410, the user device 110 can provide the input to the server computer 102. The input 116 can indicate, for example, that a particular product should be added or removed from a particular product portfolio, that a particular price change should or should not be made to a product or product portfolio, or other actions that should be taken to reduce the impact of a pricing event or other change indicated by the product impact data 108. Thus, operation 410 can correspond to the user device 110 sending to the server computer 102 these and/or other types of input 116 from the user device 110 (or other entity). Some examples of user interfaces for presenting and/or interacting with the reports 114 are illustrated and described below with reference to FIGS. 5A-5F. It should be understood that this example embodiment is illustrative, and therefore should not be construed as being limiting in any way.

From operation 410, the method 400 can proceed to operation 412. The method 400 can end at operation 412.

Figure 5A:
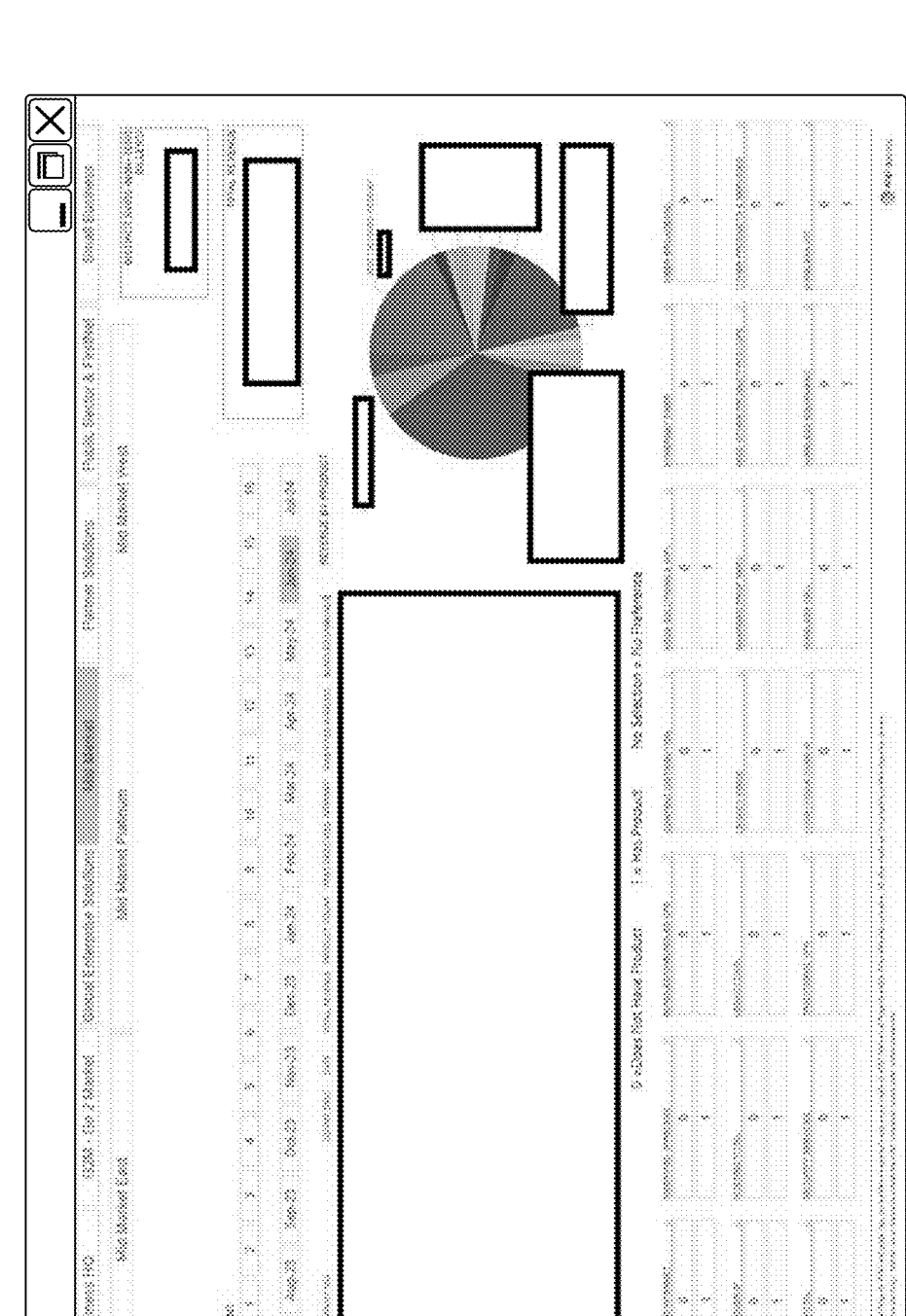
FIGS. 5A-5F are user interface diagrams illustrating additional aspects of the concepts and technologies disclosed herein, according to illustrative embodiments of the concepts and technologies disclosed herein.

FIGS. 5A-5F are user interface ("UI") diagrams showing aspects of UIs for using and/or interacting with the product impact service 106 and/or the report analysis application 136, according to some illustrative embodiments. FIG. 5A shows an illustrative screen display 500A. According to some embodiments of the concepts and technologies described herein, the screen display 500A can be generated by a device such as the user device 110 via interactions with the product impact service 106 and/or the report analysis application 136. It should be appreciated that the UI diagram illustrated in FIG. 5A is illustrative of one contemplated example of the UIs that can be generated and/or displayed in accordance with the concepts and technologies disclosed herein, and therefore should not be construed as being limiting in any way.

According to various embodiments, the screen display 500A can be presented, for example, when the user device 110 connects to the product impact service 106 via, for example, a web page or portal or the like. Because the screen display 500A illustrated in FIG. 5A can be displayed at additional and/or alternative times, it should be understood that these examples are illustrative and therefore should not be construed as being limiting in any way.

The screen display 500A can include various menus and/or menu options (not shown in FIG. 5A). The screen display 500A also can include a dashboard view. The dashboard view can be used to see an overview of a product, customer, customer cohort, product portfolio, or the like. It can be appreciated that the dashboard view can correspond to the report 114 illustrated and described herein and can be requested, for example, by the user device 110 connecting to the product impact service 106 and/or by explicitly requesting the report 114. The other screen displays illustrated and described herein can be accessed directly by the user device 110 (or other device) and/or navigated through by interacting with the dashboard view in various embodiments. It should be understood that this example is illustrative and therefore should not be construed as being limiting in any way.

Figure 5B:
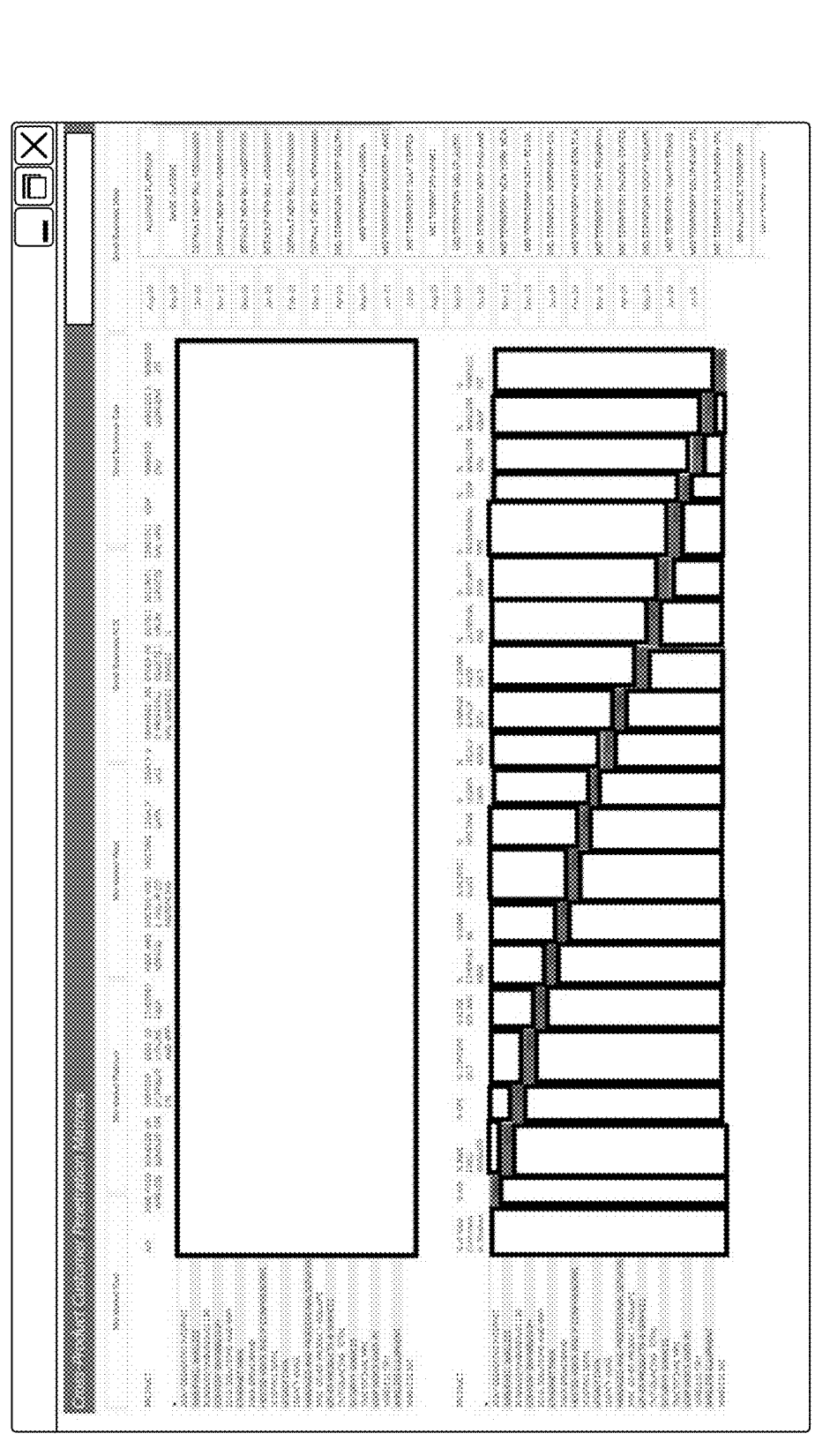

FIG. 5B shows an illustrative screen display 500B. According to some embodiments of the concepts and technologies described herein, the screen display 500B can be generated by a device such as the user device 110 via interactions with the product impact service 106 and/or the report analysis application 136. It should be appreciated that the UI diagram illustrated in FIG. 5B is illustrative of one contemplated example of the UIs that can be generated and/or displayed in accordance with the concepts and technologies disclosed herein, and therefore should not be construed as being limiting in any way.

According to various embodiments, the screen display 500B can be presented, for example, when the user device 110 requests a cross-product customer penetration portion of the report 114. Because the screen display 500B illustrated in FIG. 5B can be displayed at additional and/or alternative times, it should be understood that these examples are illustrative and therefore should not be construed as being limiting in any way.

The screen display 500B can include various menus and/or menu options (not shown in FIG. 5B). The screen display 500B also can include a cross-product penetration view. The cross-product penetration view can be used to see relationships between products and/or product portfolios. It can be appreciated that the cross-product penetration view can correspond to a portion of the report 114 illustrated and described herein and can be requested, for example, by the user device 110 connecting to the product impact service 106 and/or by explicitly requesting the report 114. At any rate, the cross-product penetration view can be analyzed by a user or other entity to determine relationships between products and/or how customers can be expected to request and/or interact with multiple products based on the use of a second product. It should be understood that this example is illustrative and therefore should not be construed as being limiting in any way.

Figure 5C:
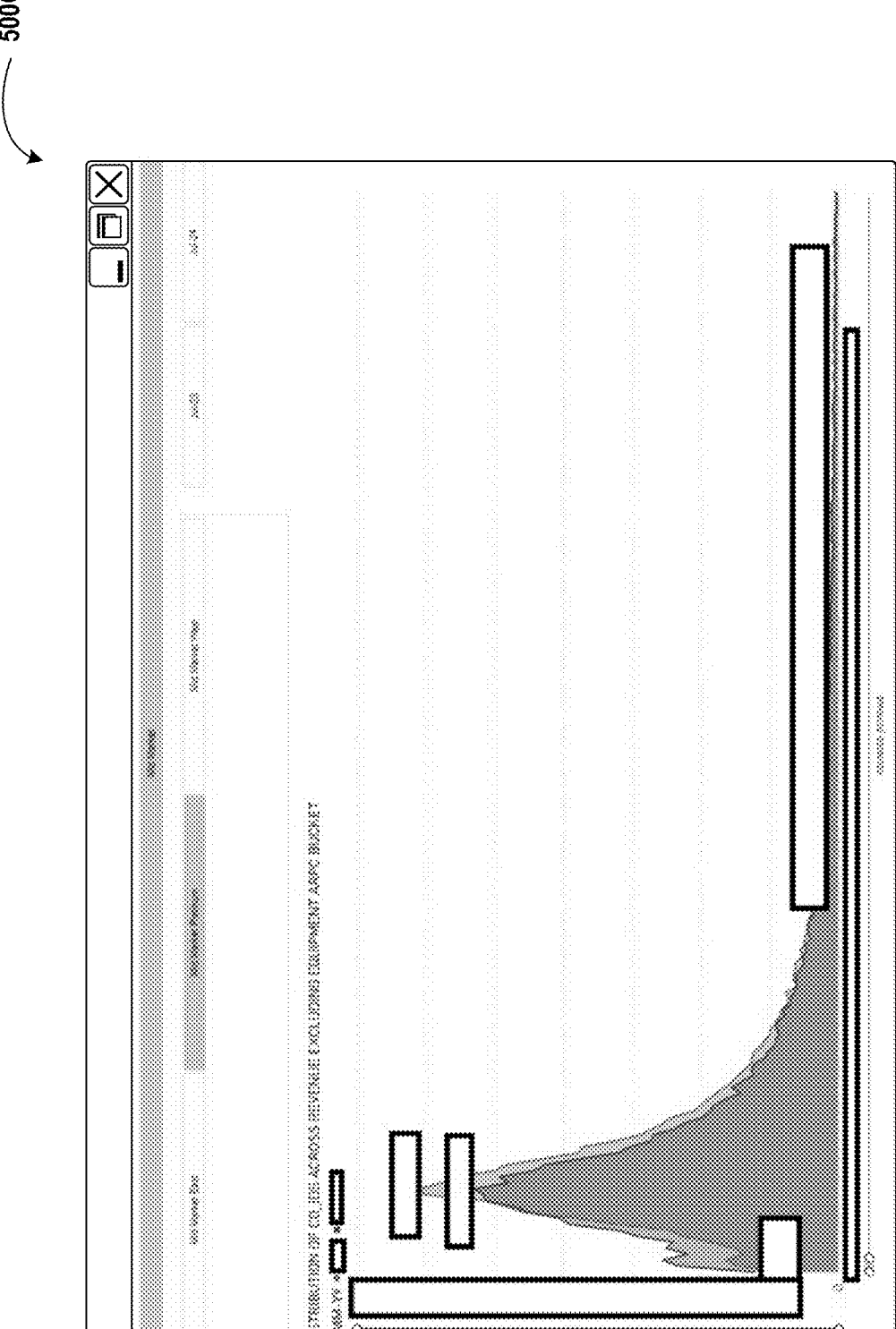

FIG. 5C shows an illustrative screen display 500C. According to some embodiments of the concepts and technologies described herein, the screen display 500C can be generated by a device such as the user device 110 via interactions with the product impact service 106 and/or the report analysis application 136. It should be appreciated that the UI diagram illustrated in FIG. 5C is illustrative of one contemplated example of the UIs that can be generated and/or displayed in accordance with the concepts and technologies disclosed herein, and therefore should not be construed as being limiting in any way.

According to various embodiments, the screen display 500C can be presented, for example, when the user device 110 requests a product revenue portion of the report 114. Because the screen display 500C illustrated in FIG. 5C can be displayed at additional and/or alternative times, it should be understood that these examples are illustrative and therefore should not be construed as being limiting in any way.

The screen display 500C can include various menus and/or menu options (not shown in FIG. 5C). The screen display 500C also can include a product revenue view. The product revenue view can be used to see revenues for a particular product and/or product portfolio over time. It can be appreciated that the product revenue view can correspond to a portion of the report 114 illustrated and described herein and can be requested, for example, by the user device 110 connecting to the product impact service 106 and/or by explicitly requesting the report 114. At any rate, the product revenue view can be analyzed by a user or other entity to determine an outlook and/or history for revenues associated with a product and/or product portfolio. It should be understood that this example is illustrative and therefore should not be construed as being limiting in any way.

Figure 5D:
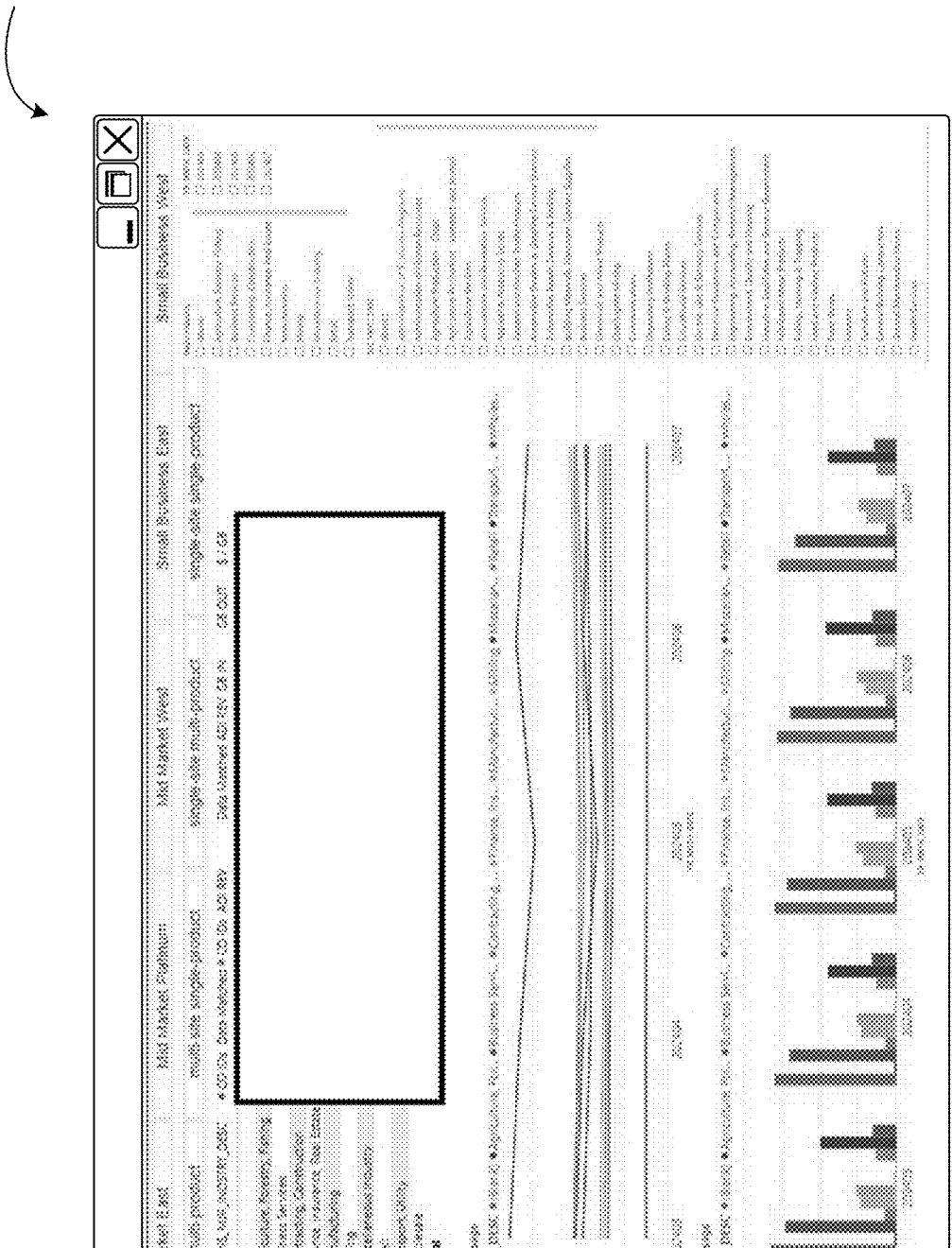

FIG. 5D shows an illustrative screen display 500D. According to some embodiments of the concepts and technologies described herein, the screen display 500D can be generated by a device such as the user device 110 via interactions with the product impact service 106 and/or the report analysis application 136. It should be appreciated that the UI diagram illustrated in FIG. 5D is illustrative of one contemplated example of the UIs that can be generated and/or displayed in accordance with the concepts and technologies disclosed herein, and therefore should not be construed as being limiting in any way.

According to various embodiments, the screen display 500D can be presented, for example, when the user device 110 requests a customer archetype portion of the report 114. Because the screen display 500D illustrated in FIG. 5D can be displayed at additional and/or alternative times, it should be understood that these examples are illustrative and therefore should not be construed as being limiting in any way.

The screen display 500D can include various menus and/or menu options (not shown in FIG. 5D). The screen display 500D also can include a customer archetype view. The customer archetype view can be used to see archetypes that use and/or subscribe to a particular product and/or product portfolio over time. It can be appreciated that the customer archetype view can correspond to a portion of the report 114 illustrated and described herein and can be requested, for example, by the user device 110 connecting to the product impact service 106 and/or by explicitly requesting the report 114. At any rate, the customer archetype view can be analyzed by a user or other entity to determine customers and/or customer cohorts that use a product and/or product portfolio. It should be understood that this example is illustrative and therefore should not be construed as being limiting in any way.

Figure 5E:
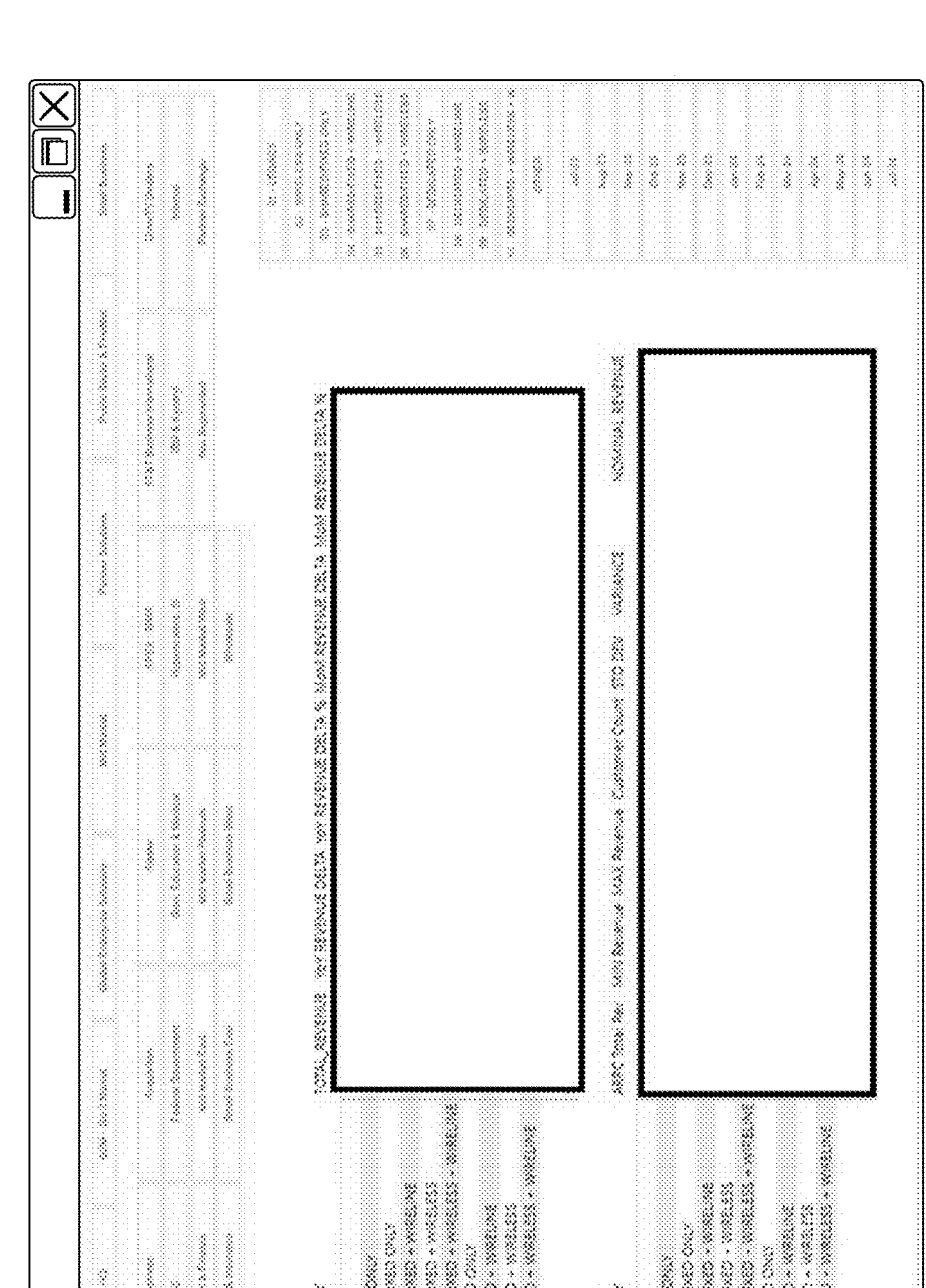

FIG. 5E shows an illustrative screen display 500E. According to some embodiments of the concepts and technologies described herein, the screen display 500E can be generated by a device such as the user device 110 via interactions with the product impact service 106 and/or the report analysis application 136. It should be appreciated that the UI diagram illustrated in FIG. 5E is illustrative of one contemplated example of the UIs that can be generated and/or displayed in accordance with the concepts and technologies disclosed herein, and therefore should not be construed as being limiting in any way.

According to various embodiments, the screen display 500E can be presented, for example, when the user device 110 requests a customer archetype detail portion of the report 114. Because the screen display 500E illustrated in FIG. 5E can be displayed at additional and/or alternative times, it should be understood that these examples are illustrative and therefore should not be construed as being limiting in any way.

The screen display 500E can include various menus and/or menu options (not shown in FIG. 5E). The screen display 500E also can include a customer archetype detail view. The customer archetype detail view can be used to see various details of a particular customer archetype that uses and/or subscribes to a particular product and/or product portfolio over time. It can be appreciated that the customer archetype detail view can correspond to a portion of the report 114 illustrated and described herein and can be requested, for example, by the user device 110 connecting to the product impact service 106 and/or by explicitly requesting the report 114. At any rate, the customer archetype detail view can be analyzed by a user or other entity to determine additional details of a particular customer or customer archetype that uses a product and/or product portfolio. It should be understood that this example is illustrative and therefore should not be construed as being limiting in any way.

Figure 5F:
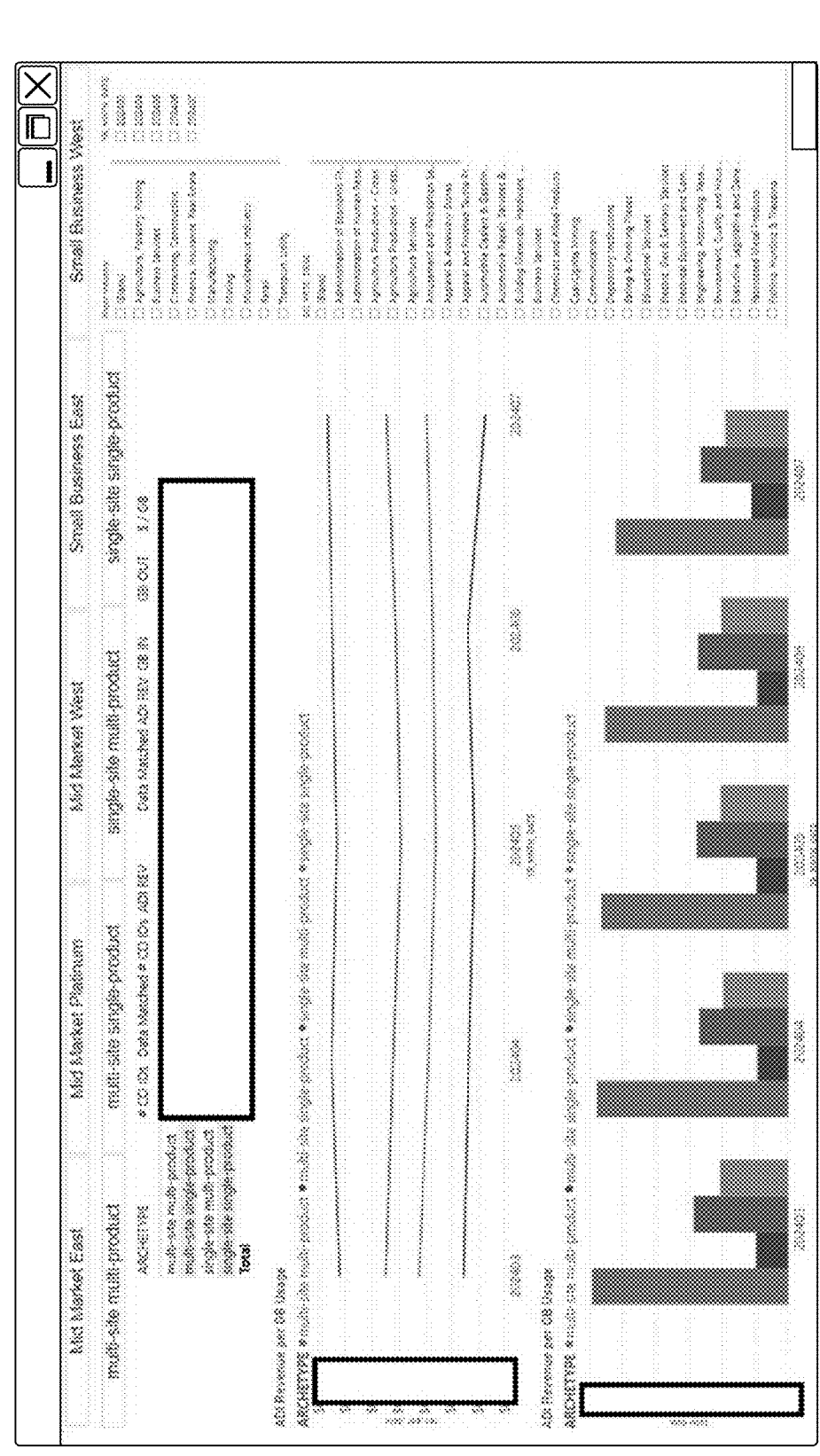

FIG. 5F shows an illustrative screen display 500F. According to some embodiments of the concepts and technologies described herein, the screen display 500F can be generated by a device such as the user device 110 via interactions with the product impact service 106 and/or the report analysis application 136. It should be appreciated that the UI diagram illustrated in FIG. 5F is illustrative of one contemplated example of the UIs that can be generated and/or displayed in accordance with the concepts and technologies disclosed herein, and therefore should not be construed as being limiting in any way.

According to various embodiments, the screen display 500F can be presented, for example, when the user device 110 requests a customer archetype revenue per data usage detail portion of the report 114. Because the screen display 500F illustrated in FIG. 5F can be displayed at additional and/or alternative times, it should be understood that these examples are illustrative and therefore should not be construed as being limiting in any way.

The screen display 500F can include various menus and/or menu options (not shown in FIG. 5F). The screen display 500F also can include a customer archetype revenue per data usage detail view. The customer archetype revenue per data usage detail view can be used to see various details of a particular customer archetype that uses and/or subscribes to a particular product and/or product portfolio over time, on a per data usage basis. It can be appreciated that the customer archetype revenue per data usage detail view can correspond to a portion of the report 114 illustrated and described herein and can be requested, for example, by the user device 110 connecting to the product impact service 106 and/or by explicitly requesting the report 114. At any rate, the customer archetype revenue per data usage detail view can be analyzed by a user or other entity to determine additional details of a particular customer or customer archetype that uses a product and/or product portfolio. It should be understood that this example is illustrative and therefore should not be construed as being limiting in any way.

Although not illustrated in FIGS. 5A-5F, it should be understood that a user interface for proposing a price increase can be provided by the product impact service 106 and/or other applications at the server computer 102 and/or the user device 110. Thus, for example, a user or other entity can enter contours (e.g., amounts, schedules, affected products, affected product portfolios, affected customers, affected customer cohorts, combinations thereof, or the like) of the price increase and generate, based on the proposed price increase, a report request 112. Thus, it can be appreciated that a proposed price increase can be evaluated using embodiments of the concepts and technologies disclosed herein. It should be understood that this example embodiment is illustrative, and therefore should not be construed as being limiting in any way.

Figure 6:
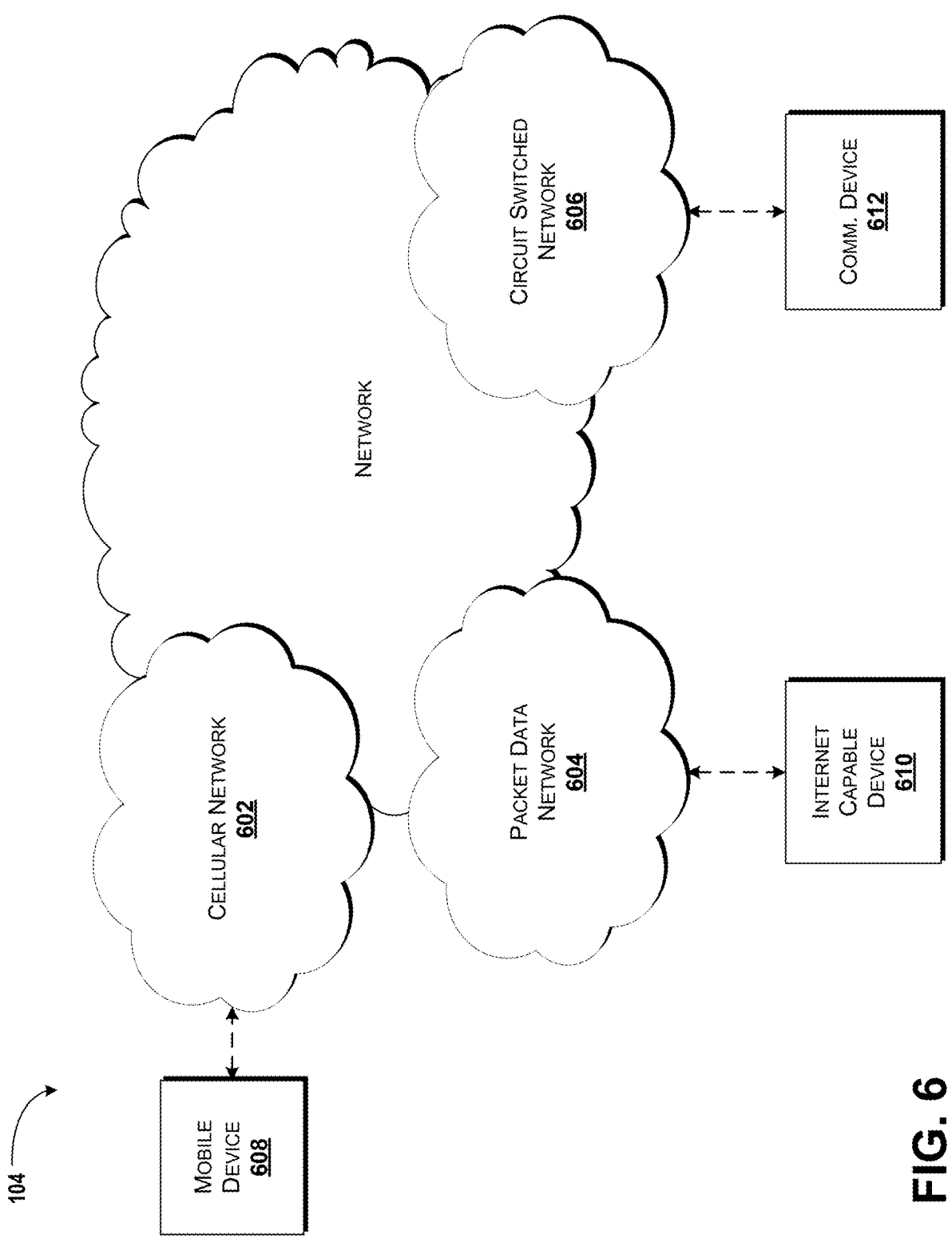
FIG. 6 schematically illustrates a network, according to an illustrative embodiment of the concepts and technologies described herein.

Turning now to FIG. 6, additional details of the network 104 are illustrated, according to an illustrative embodiment. The network 104 includes a cellular network 602, a packet data network 604, for example, the Internet, and a circuit switched network 606, for example, a publicly switched telephone network ("PSTN"). The cellular network 602 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs"); authentication server functions ("AUSFs"), network slice selection functions ("NSSFs); network exposure functions ("NEFs"); policy control functions ("PCFs"); and various other functions in the user and control planes such as, for example, user plane functions ("UPFs"), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 602 also can include various interfaces between various components, as is generally understood. The cellular network 602 also includes radios and nodes for receiving and transmitting voice, data, and combinations thereof to and from radio transceivers, networks, the packet data network 604, and the circuit switched network 606.

A mobile communications device 608, such as, for example, a cellular telephone, a user equipment, a mobile terminal, a PDA, a laptop computer, a handheld computer, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards, 5G mobile communications standards, 6G mobile communication standards, other mobile communications standards, and evolved and future mobile communications standards.

The packet data network 604 includes various devices, for example, servers, computers, databases, and other devices in communication with one another, as is generally known. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system (POTS). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610. In the specification, the network 104 is used to refer broadly to any combination of the networks 602, 604, 606. It should be appreciated that substantially all of the functionality described with reference to the network 104 can be performed by the cellular network 602, the packet data network 604, and/or the circuit switched network 606, alone or in combination with other networks, network elements, and the like.

Figure 7:
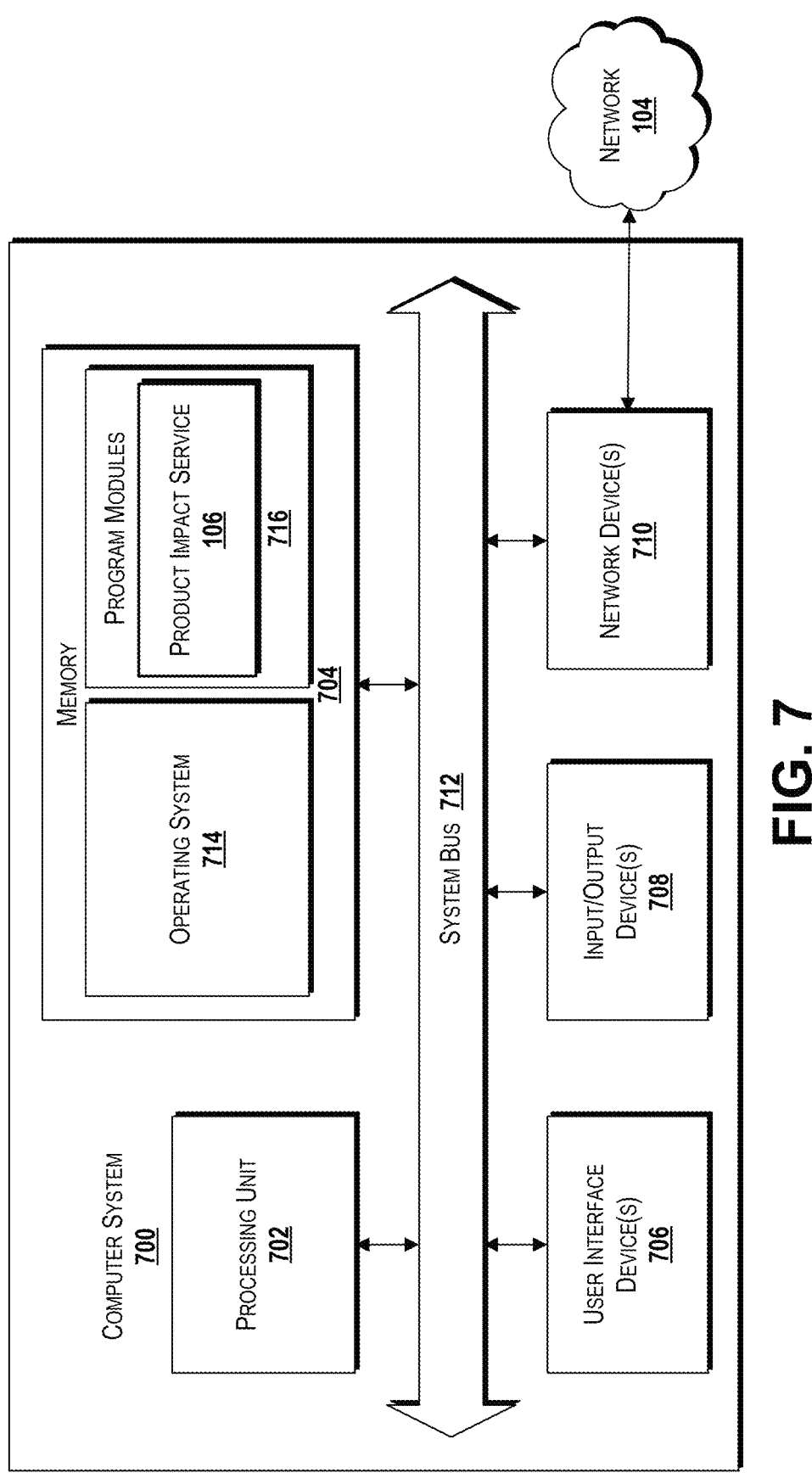
FIG. 7 is a block diagram illustrating an example computer system configured to provide a telecommunications product impact service, according to some illustrative embodiments of the concepts and technologies described herein.

FIG. 7 is a block diagram illustrating a computer system 700 configured to provide the functionality described herein for telecommunications product impact service, in accordance with various embodiments of the concepts and technologies disclosed herein. The computer system 700 includes a processing unit 702, a memory 704, one or more user interface devices 706, one or more input/output ("I/O") devices 708, and one or more network devices 710, each of which is operatively connected to a system bus 712. The system bus 712 can enable bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 704 communicates with the processing unit 702 via the system bus 712. In some embodiments, the memory 704 is operatively connected to a memory controller (not shown) that enables communication with the processing unit 702 via the system bus 712. The memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 716 may include various software and/or program modules described herein. In some embodiments, for example, the program modules 716 include the product impact service 106 and/or the report analysis application 136. These and/or other programs can be embodied in computer-readable media containing instructions that, when executed by the processing unit 702, perform one or more of the methods 200, 300, and 400 described in detail above with respect to FIGS. 2-4 and/or other functionality as illustrated and described herein. It can be appreciated that, at least by virtue of the instructions embodying the methods 200, 300, 400, and/or other functionality illustrated and described herein being stored in the memory 704 and/or accessed and/or executed by the processing unit 702, the computer system 700 is a special-purpose computing system that can facilitate providing the functionality illustrated and described herein. According to embodiments, the program modules 716 may be embodied in hardware, software, firmware, or any combination thereof. Although not shown in FIG. 7, it should be understood that the memory 704 also can be configured to store the usage and change data 124 (and/or the components thereof including the product data 126, the billing data 128, the customer data 130, the grouping data 132, or other data (not numbered in the FIGURES)) and/or other data, if desired.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, personal digital assistants, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer.

The network devices 710 enable the computer system 700 to communicate with other networks or remote systems via a network, such as the network 104. Examples of the network devices 710 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 8:
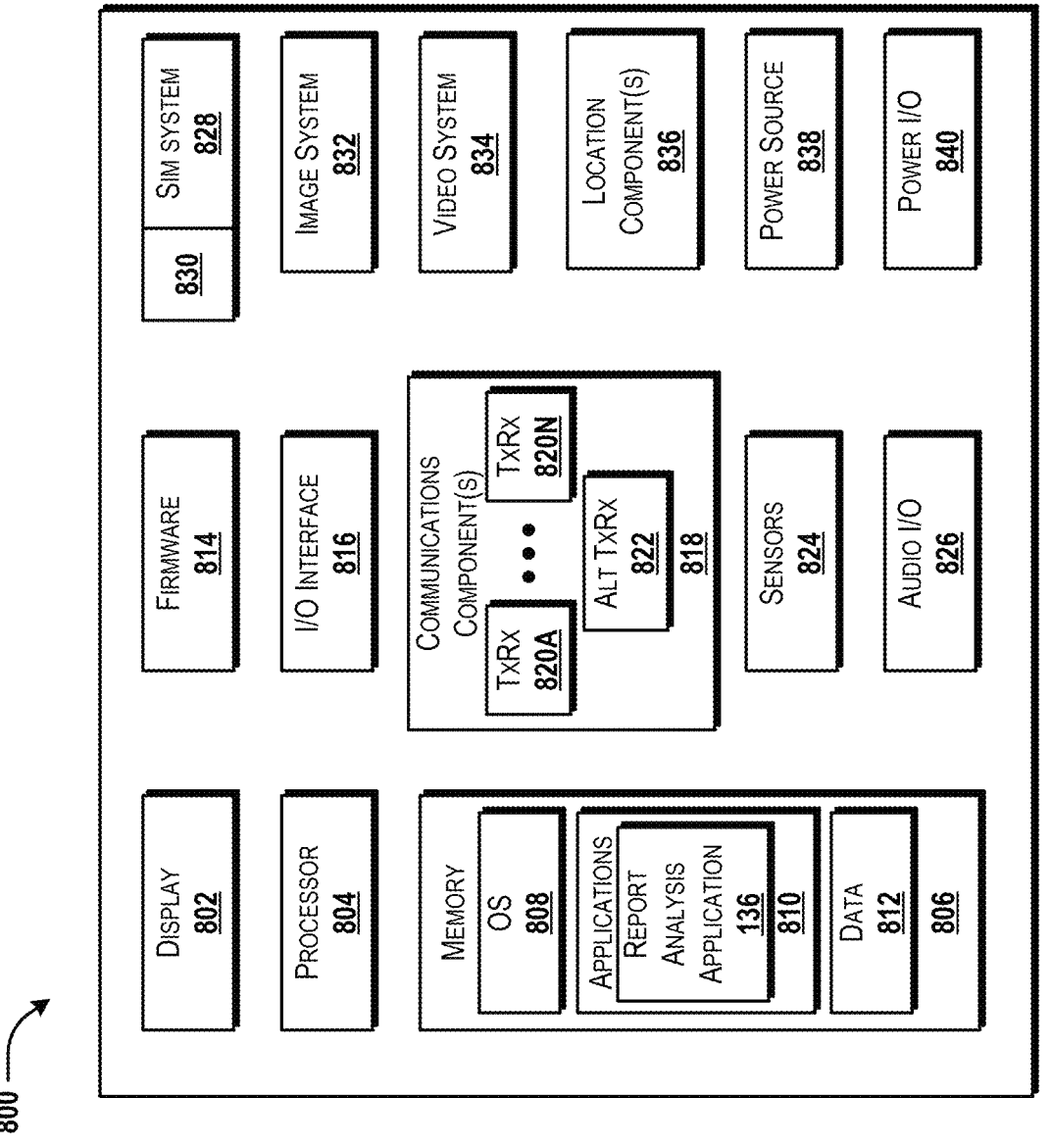
FIG. 8 is a block diagram illustrating an example mobile device configured to interact with a telecommunications product impact service, according to some illustrative embodiments of the concepts and technologies described herein.

Turning now to FIG. 8, an illustrative mobile device 800 and components thereof will be described. In some embodiments, the user device 110 described herein can be configured as and/or can have an architecture similar or identical to the mobile device 800 described herein in FIG. 8. It should be understood, however, that the user device 110 may or may not include the functionality described herein with reference to FIG. 8. While connections are not shown between the various components illustrated in FIG. 8, it should be understood that some, none, or all of the components illustrated in FIG. 8 can be configured to interact with one another to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements such as, for example, data from the reports 114, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810 such as the report analysis application 136, other computer-executable instructions stored in a memory 806, or the like. In some embodiments, the applications 810 also can include a UI application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPO- RATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, generating report requests 112, reviewing reports 114, providing input 116, defining actions to take for products, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, the report analysis application 136 and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804.

It can be appreciated that, at least by virtue of storage of the instructions corresponding to the applications 810 and/or other instructions embodying other functionality illustrated and described herein in the memory 806, and/or by virtue of the instructions corresponding to the applications 810 and/or other instructions embodying other functionality illustrated and described herein being accessed and/or executed by the processor 804, the mobile device 800 is a special-purpose mobile device that can facilitate providing the functionality illustrated and described herein. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, report requests 112, reports 114, input 116, commands 134, user information, organization information, presence status information, user IDs, passwords, and application initiation (start-up) requests. In some embodiments, the I/O interface 816 can include a hardware connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as the network 104 described herein. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMAONE, CDMA2000, LTE, and various other 2G, 2.5G, 3G, 4G, 5G, 6G, and greater generation technology standards. Moreover, the communications component 818 may facilitate communications over various channel access methods (which may or may not be used by the aforementioned standards) including, but not limited to, TDMA, FDMA, W-CDMA, OFDM, SDMA, and the like.

In addition, the communications component 818 may facilitate data communications using GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted-GPS ("A-GPS") devices, WI-FI/ WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
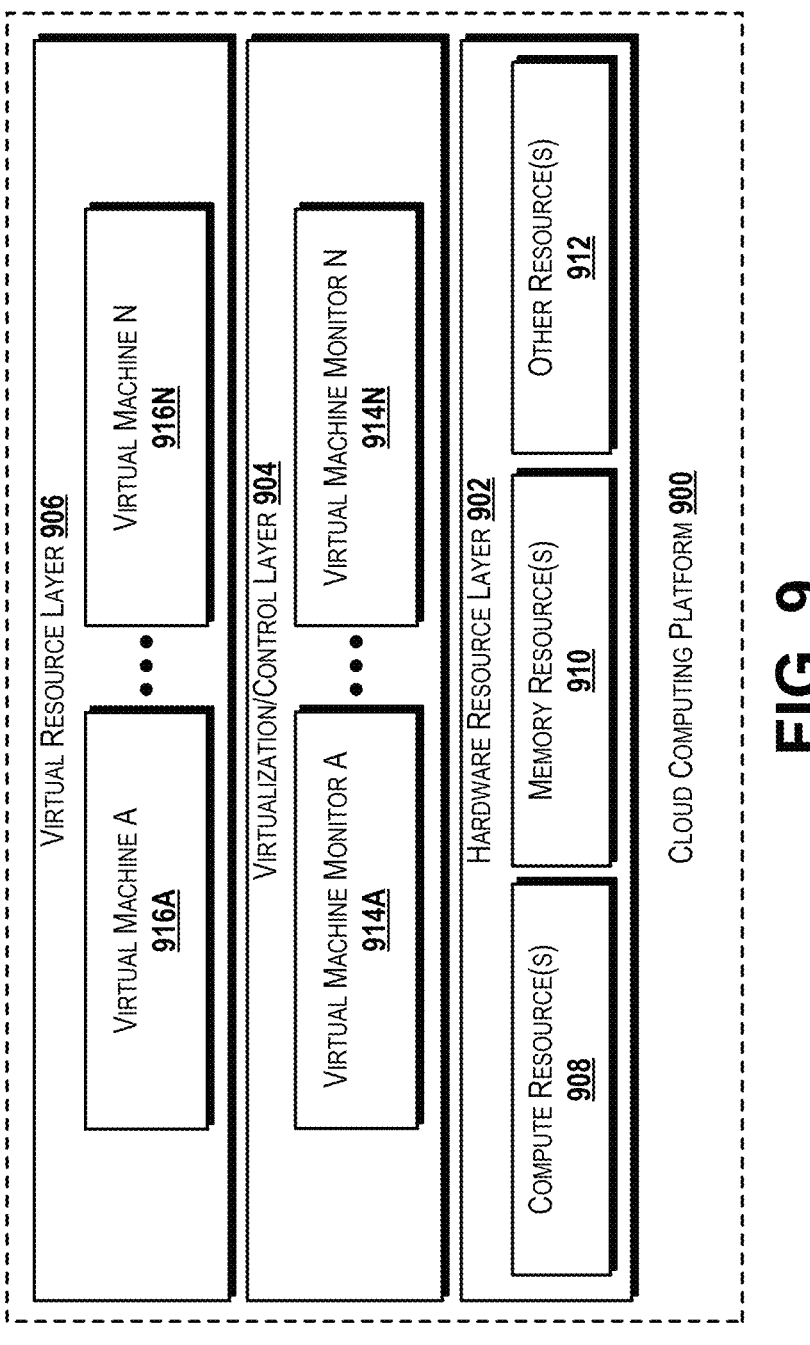
FIG. 9 is a diagram illustrating a computing environment capable of implementing aspects of the concepts and technologies disclosed herein, according to some illustrative embodiments of the concepts and technologies described herein.

FIG. 9 illustrates an illustrative architecture for a cloud computing platform 900 that can be capable of executing the software components described herein for a telecommunications product impact service and/or for interacting with the product impact service 106 and/or the report analysis application 136. The cloud computing platform 900 also can be capable of hosting and/or executing functionality associated with the network management entities 120 and/or one or more of the data sources 122. Thus, it can be appreciated that in some embodiments of the concepts and technologies disclosed herein, the cloud computing platform 900 illustrated in FIG. 9 can be used to provide the functionality described herein with respect to the server computer 102, the user device 110, the customer devices 118, the network management entities 120, and/or one or more of the data sources 122.

The cloud computing platform 900 thus may be utilized to execute any aspects of the software components presented herein. Thus, according to various embodiments of the concepts and technologies disclosed herein, the product impact service 106 and/or the report analysis application 136 can be implemented, at least in part, on or by elements included in the cloud computing platform 900 illustrated and described herein. Those skilled in the art will appreciate that the illustrated cloud computing platform 900 is a simplification of but only one possible implementation of an illustrative cloud computing platform, and as such, the illustrated cloud computing platform 900 should not be construed as being limiting in any way.

In the illustrated embodiment, the cloud computing platform 900 can include a hardware resource layer 902, a virtualization/control layer 904, and a virtual resource layer 906. These layers and/or other layers can be configured to cooperate with each other and/or other elements of a cloud computing platform 900 to perform operations as will be described in detail herein. While connections are shown between some of the components illustrated in FIG. 9, it should be understood that some, none, or all of the components illustrated in FIG. 9 can be configured to interact with one another to carry out various functions described herein. In some embodiments, the components are arranged so as to communicate via one or more networks such as, for example, the network 104 illustrated and described herein-above (not shown in FIG. 9). Thus, it should be understood that FIG. 9 and the following description are intended to provide a general understanding of a suitable environment in which various aspects of embodiments can be implemented, and should not be construed as being limiting in any way.

The hardware resource layer 902 can provide hardware resources. In the illustrated embodiment, the hardware resources can include one or more compute resources 908, one or more memory resources 910, and one or more other resources 912. The compute resource(s) 908 can include one or more hardware components that can perform computations to process data, and/or to execute computer-executable instructions of one or more application programs, operating systems, services, and/or other software including, but not limited to, the product impact service 106 and/or the report analysis application 136 illustrated and described herein.

According to various embodiments, the compute resources 908 can include one or more central processing units ("CPUs"). The CPUs can be configured with one or more processing cores. In some embodiments, the compute resources 908 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 908 can include one or more discrete GPUs. In some other embodiments, the compute resources 908 can include one or more CPU and/or GPU components that can be configured in accordance with a co-processing CPU/GPU computing model. Thus, it can be appreciated that in some embodiments of the compute resources 908, a sequential part of an application can execute on a CPU and a computationally-intensive part of the application can be accelerated by the GPU. It should be understood that this example is illustrative, and therefore should not be construed as being limiting in any way.

In some embodiments, the compute resources 908 also can include one or more system on a chip ("SoC") components. It should be understood that an SoC component can operate in association with one or more other components as illustrated and described herein, for example, one or more of the memory resources 910 and/or one or more of the other resources 912. In some embodiments in which an SoC component is included, the compute resources 908 can be or can include one or more embodiments of the SNAP-DRAGON brand family of SoCs, available from QUAL-COMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 908 can be or can include one or more hardware components arranged in accordance with an ARM architecture, available for license from ARM HOLD-INGS of Cambridge, United Kingdom. Alternatively, the compute resources 908 can be or can include one or more hardware components arranged in accordance with an x86 architecture, such as an architecture available from INTEL CORPORATION of Mountain View, California, and others. Those skilled in the art will appreciate the implementation of the compute resources 908 can utilize various computation architectures and/or processing architectures. As such, the various example embodiments of the compute resources 908 as mentioned hereinabove should not be construed as being limiting in any way. Rather, implementations of embodiments of the concepts and technologies disclosed herein can be implemented using compute resources 908 having any of the particular computation architecture and/or combination of computation architectures mentioned herein as well as other architectures.

Although not separately illustrated in FIG. 9, it should be understood that the compute resources 908 illustrated and described herein can host and/or execute various services, applications, portals, and/or other functionality illustrated and described herein. Thus, the compute resources 908 can host and/or can execute the product impact service 106, the report analysis application 136, and/or other applications or services illustrated and described herein.

The memory resource(s) 910 can include one or more hardware components that can perform or provide storage operations, including temporary and/or permanent storage operations. In some embodiments, the memory resource(s) 910 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 908, subject to the definition of "computer storage media" provided above (e.g., as excluding waves and signals per se and/or communication media as defined in this application).

Although not illustrated in FIG. 9, it should be understood that the memory resources 910 can host or store the various data illustrated and described herein including, but not limited to, the product impact data 108, the report requests 112, the reports 114, the input 116, the usage and change data 124 (and/or components thereof including, but not limited to, the product data 126, the billing data 128, the customer data 130, the grouping data 132, other data (not labeled in the FIGURES)), the commands 134, and/or other data, if desired. It should be understood that this example is illustrative, and therefore should not be construed as being limiting in any way.

The other resource(s) 912 can include any other hardware resources that can be utilized by the compute resources(s) 908 and/or the memory resource(s) 910 to perform operations. The other resource(s) 912 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 902 can be virtualized by one or more virtual machine monitors ("VMMs") 914A-914N (also known as "hypervisors;" hereinafter "VMMs 914"). The VMMs 914 can operate within the virtualization/control layer 904 to manage one or more virtual resources that can reside in the virtual resource layer 906. The VMMs 914 can be or can include software, firmware, and/or hardware that alone or in combination with other software, firmware, and/or hardware, can manage one or more virtual resources operating within the virtual resource layer 906.

The virtual resources operating within the virtual resource layer 906 can include abstractions of at least a portion of the compute resources 908, the memory resources 910, the other resources 912, or any combination thereof. These abstractions are referred to herein as virtual machines ("VMs"). In the illustrated embodiment, the virtual resource layer 906 includes VMs 916A-916N (hereinafter "VMs 916").

Based on the foregoing, it should be appreciated that systems and methods for providing a telecommunications product impact service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:

receiving, by a server computer and from a user device that operates on a communications network, a report request comprising a request for a product impact report for a telecommunications product that is offered by the communications network to a customer device, wherein the report request comprises data that identifies the telecommunications product;

analyzing, based on the data that identifies the telecommunications product, product impact data that comprises product overview data, cohort data, and pricing data, and wherein the product impact data reflects usage of the telecommunications product on the communications network, a customer that uses the telecommunications product, and an impact, on a subscription to the telecommunications product, of a pricing change for the telecommunications product;

generating, based on the product impact data identified, a report that comprises data identifying the impact of the pricing change for the telecommunications product, wherein the pricing change comprises an increase in a charge for the telecommunications product, and wherein the impact of the pricing change comprises a predicted change in the usage of the telecommunications product on the communications network by particular customers;

transmitting, to the user device and via the communications network, the report, wherein responsive to receiving the report, the user device executes a report analysis application that causes the user device to analyze the report and determine an action to be taken by network management entities on the communications network with respect to the telecommunications product;

receiving, from the user device and via the communications network, input that indicates the action to be taken, wherein the action to be taken is based on the impact of the pricing change associated with the telecommunications product, wherein the action to be taken is determined by the report analysis application as an action that will reduce the impact of the pricing change, wherein the input is generated by the report analysis application based on the action to be taken, and wherein the action to be taken comprises commanding the network management entities to modify the pricing change or to add the telecommunications product to a product portfolio;

generating, by the server computer and in response to receiving the input that indicates the action to be taken, a command comprising further computer-executable instructions that, when executed by the network management entities, cause the network management entities to take the action to be taken; and triggering, by the server computer and to the network management entities via the communications network, delivery of the command, whereby the telecommunications product is modified by the network management entities to mitigate the impact of the pricing change.

2. The system of claim 1, wherein the product impact data is generated based on data obtained from data sources in communication with the network management entities.

3. The system of claim 1, wherein the computer-executable instructions, when executed by the processor, cause the processor to perform operations further comprising:

obtaining usage and change data from data sources in communication with the network management entities, the data sources comprising a product catalog, a billing database, and a customer database;

analyzing usage and change data to generate the product overview data that defines the telecommunications product, portfolio data that defines the product portfolio that includes the telecommunications product, the pricing data that defines price changes associated with the telecommunications product over time, and the cohort data that defines customers associated with the telecommunications product over time; and storing the product impact data.

4. The system of claim 3, wherein the usage and change data comprises product data, billing data, customer data, and grouping data.

5. The system of claim 3, wherein the data sources further comprise an account database and other databases.

6. The system of claim 5, wherein the other databases store revenue data for the telecommunications product, and wherein the report reflects revenue associated with the telecommunications product over time.

7. The system of claim 1, wherein the report further comprises an identification of the telecommunications product, the customer that uses the telecommunications product, a customer cohort associated with the telecommunications product, and a usage history associated with the telecommunications product.

8. A method comprising:

receiving, at a server computer that operates on a communications network and from a user device that operates on the communications network, a report request comprising a request for a product impact report for a telecommunications product that is offered by the communications network to a customer device, wherein the report request comprises data that identifies the telecommunications product, and wherein the server computer comprises a processor;

analyzing, by the processor and based on the data that identifies the telecommunications product, product impact data that comprises product overview data, cohort data, and pricing data, and wherein the product impact data reflects usage of the telecommunications product, a customer that uses the telecommunications product, and an impact, on a subscription to the telecommunications product, of a pricing change for the telecommunications product;

generating, by the processor and based on the product impact data identified, a report that comprises data identifying the impact of the pricing change associated with the telecommunications product, wherein the pricing change comprises an increase in a charge for the telecommunications product, and wherein the impact of the pricing change comprises a predicted change in the usage of the telecommunications product on the communications network by particular customers;

transmitting, by the server computer and to the user device via the communications network, the report, wherein responsive to receiving the report, the user device executes a report analysis application that causes the user device to analyze the report and determine an action to be taken by network management entities on the communications network with respect to the telecommunications product;

receiving, by the server computer and from the user device via the communications network, input that indicates the action to be taken, wherein the action to be taken is based on the impact of the pricing change for the telecommunications product, wherein the action to be taken is determined by the report analysis application as an action that will reduce the impact of the pricing change, wherein the input is generated by the report analysis application based on the action to be taken, and wherein the action to be taken comprises commanding the network management entities to modify the pricing change or to add the telecommunications product to a product portfolio;

generating, by the server computer and in response to receiving the input that indicates the action to be taken, a command comprising further computer-executable instructions that, when executed by the network management entities, cause the network management entities to take the action to be taken; and triggering, by the server computer and to the network management entities via the communications network, delivery of the command, whereby the telecommunications product is modified by the network management entities to mitigate the impact of the pricing change.

9. The method of claim 8, wherein the product impact data is generated based on data obtained from data sources in communication with the network management entities.

10. The method of claim 8, further comprising:

obtaining usage and change data from data sources in communication with the network management entities, the data sources comprising a product catalog, a billing database, and a customer database;

analyzing usage and change data to generate the product overview data that defines the telecommunications product, portfolio data that defines the product portfolio that includes the telecommunications product, the pricing data that defines price changes associated with the telecommunications product over time, and the cohort data that defines customers associated with the telecommunications product over time; and storing the product impact data.

11. The method of claim 10, wherein the usage and change data comprises product data, billing data, customer data, and grouping data.

12. The method of claim 10, wherein the data sources further comprise an account database and other databases.

13. The method of claim 12, wherein the other databases store revenue data for the telecommunications product, and wherein the report reflects revenue associated with the telecommunications product over time.

14. The method of claim 8, wherein the report further comprises an identification of the telecommunications product, the customer that uses the telecommunications product, a customer cohort associated with the telecommunications product, and a usage history associated with the telecommunications product.

15. A computer storage medium having computer-executable instructions stored thereon that, when executed by a processor, cause the processor to perform operations comprising:

receiving, by a server computer that operates on a communications network and from a user device that operates on the communications network, a report request comprising a request for a product impact report for a telecommunications product that is offered by the communications network to a customer device, wherein the report request comprises data that identifies the telecommunications product;

analyzing, based on the data that identifies the telecommunications product, product impact data that comprises product overview data, cohort data, and pricing data, and wherein the product impact data reflects usage of the telecommunications product, a customer that uses the telecommunications product, and an impact, on a subscription to the telecommunications product, of a pricing change for the telecommunications product;

generating, based on the product impact data identified, a report that comprises data identifying the impact of the pricing change for the telecommunications product, wherein the pricing change comprises an increase in a charge for the telecommunications product, and wherein the impact of the pricing change comprises a predicted change in the usage of the telecommunications product on the communications network by particular customers;

transmitting, to the user device and via the communications network, the report, wherein responsive to receiving the report, the user device executes a report analysis application that causes the user device to analyze the report and determine an action to be taken by network management entities on the communications network with respect to the telecommunications product;

receiving, from the user device and via the communications network, input that indicates the action to be taken, wherein the action to be taken is based on the impact of the pricing change associated with the telecommunications product, wherein the action to be taken is determined by the report analysis application as an action that will reduce the impact of the pricing change, wherein the input is generated by the report analysis application based on the action to be taken, and wherein the action to be taken comprises commanding the network management entities to modify the pricing change or to add the telecommunications product to a product portfolio;

generating, by the server computer and in response to receiving the input that indicates the action to be taken, a command comprising further computer-executable instructions that, when executed by the network management entities, cause the network management entities to take the action to be taken; and triggering, by the server computer and to the network management entities via the communications network, delivery of the command to the network management entities, whereby the telecommunications product is modified by the network management entities to mitigate the impact of the pricing change.

16. The computer storage medium of claim 15, wherein the product impact data is generated based on data obtained from data sources in communication with the network management entities.

17. The computer storage medium of claim 15, wherein the computer-executable instructions, when executed by the processor, cause the processor to perform operations further comprising:

obtaining usage and change data from data sources in communication with the network management entities, the data sources comprising a product catalog, a billing database, and a customer database;

analyzing usage and change data to generate the product overview data that defines the telecommunications product, portfolio data that defines the product portfolio that includes the telecommunications product, the pricing data that defines price changes associated with the telecommunications product over time, and the cohort data that defines customers associated with the telecommunications product over time; and storing the product impact data.

18. The computer storage medium of claim 17, wherein the usage and change data comprises product data, billing data, customer data, and grouping data.

19. The computer storage medium of claim 17, wherein the data sources further comprise an account database and other databases.

20. The computer storage medium of claim 15, wherein the other databases store revenue data for the telecommunications product, and wherein the report reflects revenue associated with the telecommunications product over time.

* * * * *